US011645872B2

(12) United States Patent
Naito et al.

(10) Patent No.: US 11,645,872 B2
(45) Date of Patent: May 9, 2023

(54) SCORING METHOD, SCORING APPARATUS, AND RECORDING MEDIUM

(71) Applicant: FUJITSU LIMITED, Kawasaki (JP)

(72) Inventors: Hirohisa Naito, Fuchu (JP); Tsuyoshi Matsumoto, Fukuoka (JP); Satoshi Shimizu, Takaoka (JP); Akihiko Yabuki, Isehara (JP); Hideaki Hirano, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 380 days.

(21) Appl. No.: 16/802,596

(22) Filed: Feb. 27, 2020

(65) Prior Publication Data

US 2020/0188736 A1 Jun. 18, 2020

Related U.S. Application Data

(63) Continuation of application No. PCT/JP2017/032000, filed on Sep. 5, 2017.

(51) Int. Cl.
*G06V 40/20* (2022.01)
*A63B 24/00* (2006.01)
(Continued)

(52) U.S. Cl.
CPC .......... *G06V 40/23* (2022.01); *A63B 24/0006* (2013.01); *A63B 24/0062* (2013.01);
(Continued)

(58) Field of Classification Search
CPC ............ A63B 24/0062; A63B 24/0006; A63B 24/0087; A63B 71/0622;
(Continued)

(56) References Cited

U.S. PATENT DOCUMENTS

| 2012/0310390 A1 | 12/2012 | Lin et al. |
| 2016/0042652 A1 | 2/2016 | Nagai et al. |
| 2016/0104298 A1 | 4/2016 | Nam |

FOREIGN PATENT DOCUMENTS

| JP | 2014-133015 A | 7/2014 |
| JP | 2016-081504 A | 5/2016 |
| WO | 2014/162787 A1 | 10/2014 |

OTHER PUBLICATIONS

Sports Innovators Online, https://www.nikkei.com/article/DGXMZO18991720Z10C17A7000000/, Jul. 21, 2017, www.nikkei.com (Year: 2017).*

(Continued)

*Primary Examiner* — Jeffrey S Vanderveen
(74) *Attorney, Agent, or Firm* — Xsensus LLP

(57) ABSTRACT

A scoring method executed by a processor, includes: acquiring sensor data obtained by measuring a competitor in a scoring competition; extracting joint information of the competitor, based on an analysis result of the sensor data; acquiring an evaluation item and an evaluation index that correspond to the joint information of the competitor, based on a rule in which a posture specified by a series of joint motions and joint angles, the evaluation item, and the evaluation index for performance evaluation are associated with each other; and evaluating a success or failure of a skill and a degree of perfection of the skill in a performance of the competitor, based on the analysis result, the evaluation item, and the evaluation index.

15 Claims, 26 Drawing Sheets

(51) Int. Cl.
  *A63B 71/06* (2006.01)
  *G06V 10/75* (2022.01)
(52) U.S. Cl.
  CPC ...... *A63B 24/0087* (2013.01); *A63B 71/0622* (2013.01); *G06V 10/75* (2022.01); *A63B 2024/0065* (2013.01); *A63B 2024/0071* (2013.01); *A63B 2071/0636* (2013.01)
(58) Field of Classification Search
  CPC .... A63B 2024/0065; A63B 2024/0071; A63B 2071/0636; A63B 71/06; G06V 40/23; G06V 10/75; G06V 20/40
  See application file for complete search history.

(56) References Cited

OTHER PUBLICATIONS

Chinese OA issued Jul. 22, 2021, in the corresponding Chinese Patent Application No. 201780094546.X.
Chinese Office Action dated Nov. 23, 2020, in corresponding Chinese Patent Application No. 201780094546.X.
International Search Report and Written Opinion dated Dec. 12, 2017 for PCT/JP2017/032000 filed on Sep. 5, 2017, 9 pages including English Translation of the International Search Report.
Nihon Keizai Shimbun, [online], Aug. 9, 2017 [retrieved: Dec. 4, 2017], Internet <URL: http://www.nikkei.com/article/DGXMZO18991720Z10C17A7000000/>, pp. 1-5.
JP-OA mailed on Oct. 26, 2021 in the corresponding Japanese patent application No. 2019-540162, 9 pp.
Nikkei, "Artistic Gymnastics, "Automatic Scoring", Fujitsu Limited, Challenge to make International Standard", Aug. 9, 2017, 17 pp.
Japanese Office Action dated Mar. 30, 2021 in the corresponding Japanese patent application No. 2019-540162.
European Office Action dated Apr. 7, 2022, in European Application No. 17924726.7.
EESR mailed on Aug. 27, 2020 for the corresponding European patent application No. 17924726.7.
Hui Zhang et al: "Grading Tai Chi Performance in Competition with RGBD Sensors", Computer Vision—ECCV 2014 Workshops, 2015 (2015), XP055723233, Cham ISBN: 978-3-319-16181-5 Retrieved from the Internet: URL:https://link.springer.com/contenVpdf/10.1007/978-3-319-16181-5_ 1.pdf [retrieved on Aug. 18, 2020].
Swinguru: "Chloe Leurquin—Swinguru Pro Presentation", Nov. 25, 2014 (Nov. 25, 2014), p. 1, XP054980795, Retrieved from the Internet: URL:https://www.youtube.com/watch?v=M3tbobua-_E [retrieved on Aug. 18, 2020].

* cited by examiner

FIG.3
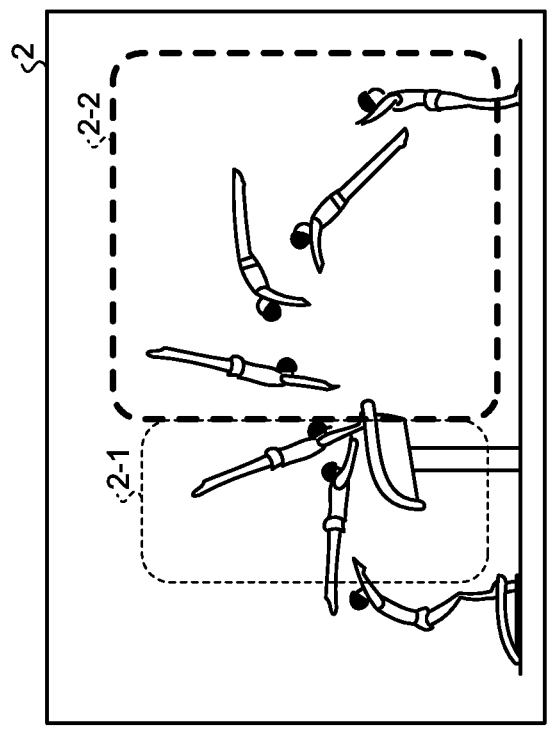
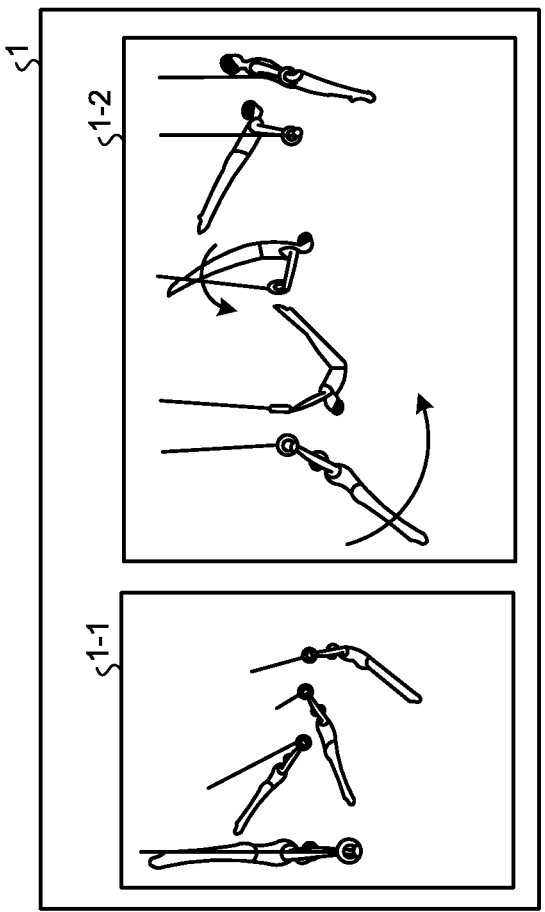

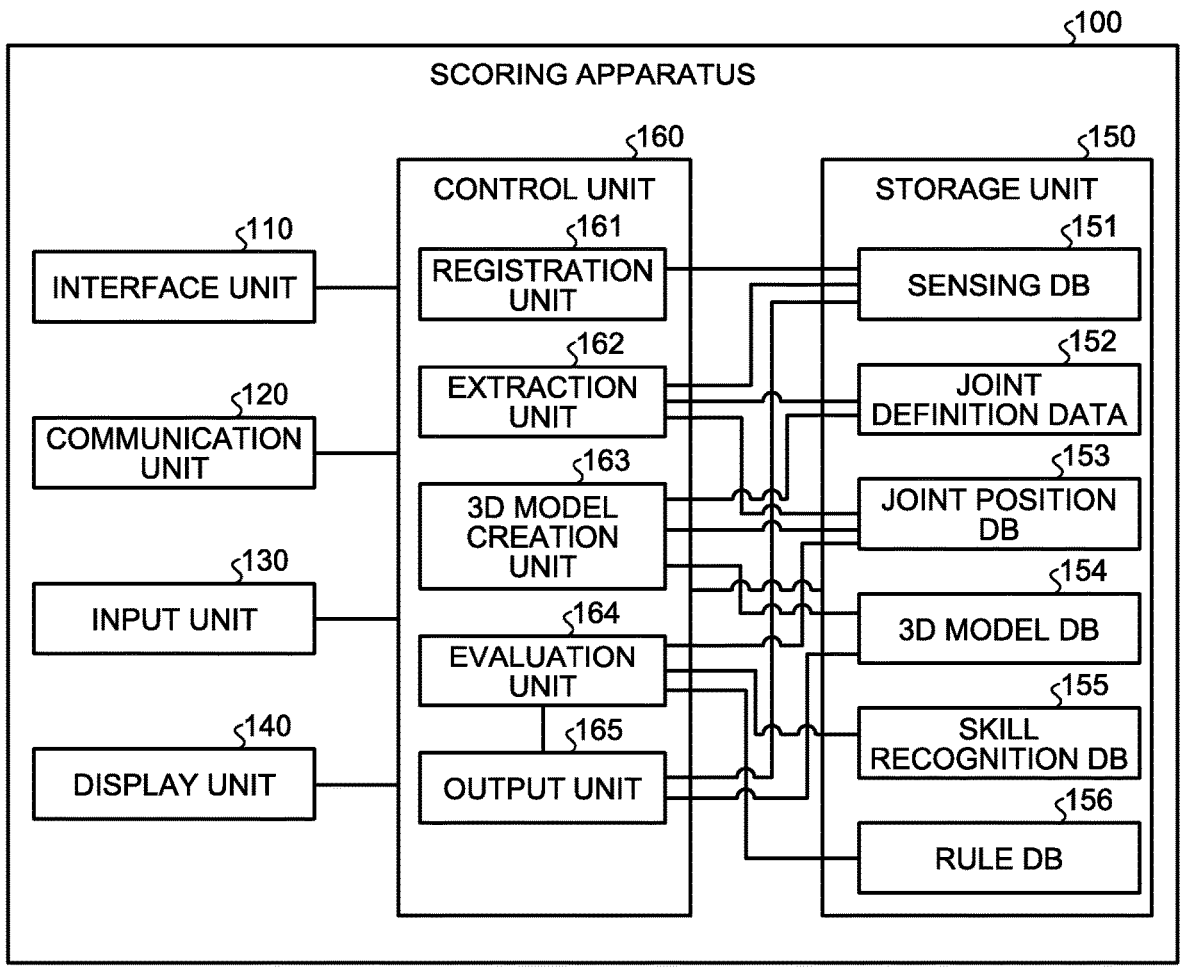

| RECORD ID | FRAME NUMBER | X0 | Y0 | Z0 | ... | X17 | Y17 | Z17 |
|---|---|---|---|---|---|---|---|---|
| P101 | 1 | 100 | 20 | 0 | | 200 | 40 | 5 |
| P101 | 2 | 101 | 25 | 5 | | 202 | 39 | 15 |
| P101 | 3 | 110 | 32 | 7 | | 210 | 45 | 12 |
| ... | ... | | | | | | | |
| P101 | 100 | 201 | 125 | 30 | | 225 | 150 | 10 |

FIG.9

| RECORD ID | FRAME NUMBER | SKELETON DATA | 3D MODEL DATA |
|---|---|---|---|
| P101 | 1 | SKELETON DATA ON RECORD ID "P101" AND FRAME NUMBER "1" | 3D MODEL DATA ON RECORD ID "P101" AND FRAME NUMBER "1" |
| | 2 | SKELETON DATA ON RECORD ID "P101" AND FRAME NUMBER "2" | 3D MODEL DATA ON RECORD ID "P101" AND FRAME NUMBER "2" |
| | 3 | SKELETON DATA ON RECORD ID "P101" AND FRAME NUMBER "3" | 3D MODEL DATA ON RECORD ID "P101" AND FRAME NUMBER "3" |
| ... | ... | ... | ... |

FIG.10

| STATIC POSTURE NAME | STATIC POSTURE SUCCESS CONDITION | MOTION POSTURE NAME | MOTION POSTURE SUCCESS CONDITION |
|---|---|---|---|
| STATIC POSTURE A1 | CONDITION FOR SUCCESS OF STATIC POSTURE A1 | MOTION POSTURE B1 | CONDITION FOR SUCCESS OF MOTION POSTURE B1 |
| STATIC POSTURE A2 | CONDITION FOR SUCCESS OF STATIC POSTURE A2 | MOTION POSTURE B2 | CONDITION FOR SUCCESS OF MOTION POSTURE B2 |
| STATIC POSTURE A3 | CONDITION FOR SUCCESS OF STATIC POSTURE A3 | MOTION POSTURE B3 | CONDITION FOR SUCCESS OF MOTION POSTURE B3 |
| ... | ... | ... | ... |

| STATIC POSTURE NAME | STATIC POSTURE SUCCESS CONDITION | | | | | |
|---|---|---|---|---|---|---|
| | SPINE ANGLE | HIP ANGLE | ARM ANGLE | ELBOW ANGLE | KNEE ANGLE | KNEES SEPARATION ANGLE |
| CROSS | $\leq \theta_{A1}$ | $\geq \theta_{A2}$ | $\theta_{A31}$ TO $\theta_{A32}$ | $\geq \theta_{A4}$ | $\geq \theta_{A5}$ | $\leq \theta_{A6}$ |

FIG.13

| MOTION POSTURE NAME | MOTION POSTURE SUCCESS CONDITION | | | | | |
|---|---|---|---|---|---|---|
| | TWIST ANGLE AT TAKEOFF | NUMBER OF SALTOS | STRETCH OR BEND POSTURE | NUMBER OF TWISTS IN 1.0 PHASE | NUMBER OF TWISTS IN 1.5 PHASE | NUMBER OF TWISTS IN 1.5 TO 2.0 PHASE |
| MOTION POSTURE B1 | $\theta_{B1}$ | $m_{11}$ | TUCK | $m_{12}$ | $m_{13}$ | $m_{14}$ |
| MOTION POSTURE B2 | $\theta_{B2}$ | $m_{21}$ | STRETCH | $m_{22}$ | $m_{23}$ | $m_{24}$ |

FIG.15

| POSTURE NAME | EVALUATION ITEM (POINT TO BE CHECKED) | EVALUATION INDEX |
|---|---|---|
| STATIC POSTURE A1 | EVALUATION ITEM CORRESPONDING TO STATIC POSTURE A1 | EVALUATION INDEX CORRESPONDING TO EVALUATION ITEM |
| STATIC POSTURE A2 | EVALUATION ITEM CORRESPONDING TO STATIC POSTURE A2 | EVALUATION INDEX CORRESPONDING TO EVALUATION ITEM |
| STATIC POSTURE A3 | EVALUATION ITEM CORRESPONDING TO STATIC POSTURE A3 | EVALUATION INDEX CORRESPONDING TO EVALUATION ITEM |
| POSTURE A4 | EVALUATION ITEM CORRESPONDING TO POSTURE A4 | EVALUATION INDEX CORRESPONDING TO EVALUATION ITEM |
| ... | ... | ... |

FIG.16

| Posture Name | Evaluation Item | | | | | | | | | | | | | | |
|---|---|---|---|---|---|---|---|---|---|---|---|---|---|---|---|
| | Horizontal Angle | Arm Angle of Cross | Shoulder Position When Swing Is Stopped | Deviation of L-Support Angle | Deviation of Handstand Angle | Twist or Turn | ... | Shoulder | Waist | Elbow | Knee | Tiptoe | Leg Opening | Deep Grip | Excessive Cable Swing | ... |
| CROSS | | O | | | | | ... | O | O | O | O | O | O | O | O | ... |
| ... | ... | ... | ... | ... | ... | ... | ... | ... | ... | ... | ... | ... | ... | ... | ... | ... |

FIG.17
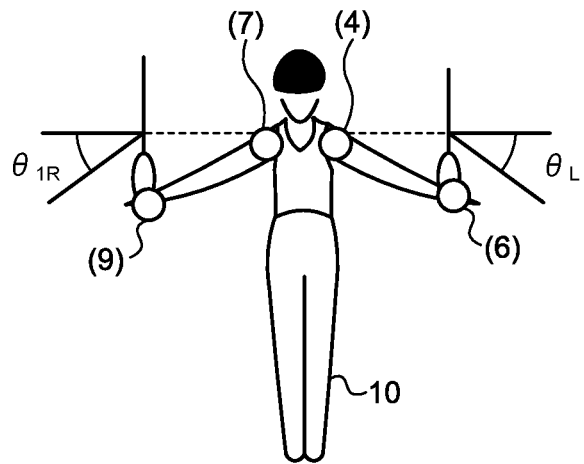
FIG.18
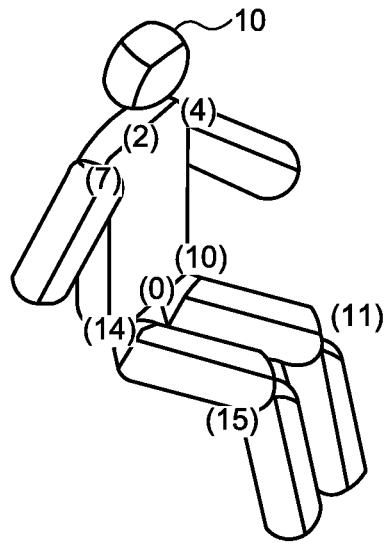
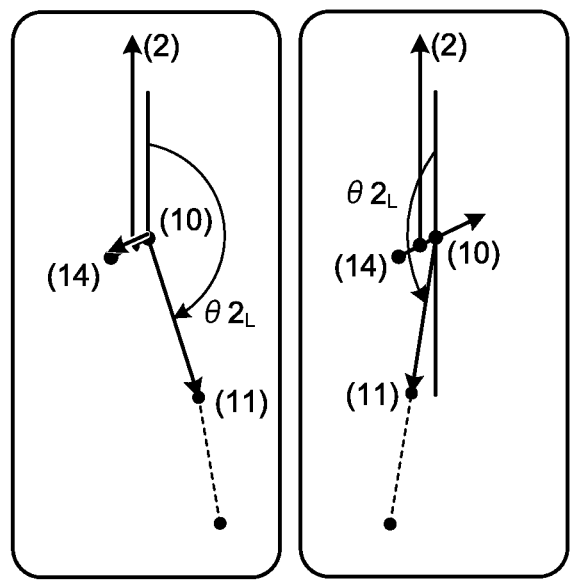

| EVALUATION ITEM | D EVALUATION INDEX | E EVALUATION INDEX |
|---|---|---|
| ARM ANGLE OF CROSS | FAILURE IN SKILL: LARGER THAN 45° | 0.1:1° TO 15°, 0.3:16° TO 30°, 0.5:31° TO 45° |
| WAIST BEND ANGLE | FAILURE IN SKILL: LARGER THAN 45° | 0.1:1° TO 15°, 0.3:16° TO 30°, 0.5:31° TO 45° |
| KNEE BEND ANGLE | FAILURE IN SKILL: LARGER THAN 45° | 0.1:1° TO 15°, 0.3:16° TO 30°, 0.5:31° TO 45° |
| ... | ... | ... |

SCORING METHOD, SCORING APPARATUS, AND RECORDING MEDIUM

CROSS-REFERENCE TO RELATED APPLICATION

This application is a continuation application of International Application PCT/JP2017/032000, filed on Sep. 5, 2017 and designating the U.S., the entire contents of which are incorporated herein by reference.

FIELD

The present invention relates to a scoring method and the like.

BACKGROUND

In artistic gymnastics, men's artistic gymnastics have six events, namely, the floor exercises, the pommel horse, the still rings, the vault, the parallel bars, and the horizontal bar, and women's artistic gymnastics have four events, namely, the vault, the uneven parallel bars, the balance beam, and the floor exercises. In the events other than the vault in both the men's and women's artistic gymnastics, one performance is composed of a plurality of consecutive skills.

A score of a performance is calculated by summing up a difficulty (D) score and an execution (E) score. For example, the D score is a score calculated based on success or failure of a skill. The E score is a score calculated using a point deduction scoring system in accordance with the degree of perfection of a skill. The success or failure of a skill and the degree of perfection of the skill are visually judged by a referee, based on a rulebook describing scoring rules.

Patent Document 1: Japanese Laid-open Patent Publication No. 2016-81504
Patent Document 2: U.S. Patent No. 2016/104298
Patent Document 3: International Publication Pamphlet No. WO 2014/162787
Patent Document 4: U.S. Patent No. 2016/042652

SUMMARY

According to an aspect of the embodiments, a scoring method executed by a processor, includes: acquiring sensor data obtained by measuring a competitor in a scoring competition; extracting joint information of the competitor, based on an analysis result of the sensor data; acquiring an evaluation item and an evaluation index that correspond to the joint information of the competitor, based on a rule in which a posture specified by a series of joint motions and joint angles, the evaluation item, and the evaluation index for performance evaluation are associated with each other; and evaluating a success or failure of a skill and a degree of perfection of the skill in a performance of the competitor, based on the analysis result, the evaluation item, and the evaluation index.

The object and advantages of the invention will be realized and attained by means of the elements and combinations particularly pointed out in the claims.

It is to be understood that both the foregoing general description and the following detailed description are exemplary and explanatory and are not restrictive of the invention.

BRIEF DESCRIPTION OF DRAWINGS

FIG. 3 is a diagram illustrating examples of motion postures;
FIG. 5 is a functional block diagram illustrating a configuration of a scoring apparatus according to the present embodiment;
FIG. 6 is a diagram illustrating an example of a data structure of a sensing database (DB) according to the present embodiment;
FIG. 9 is a diagram illustrating an example of a data structure of a three-dimensional (3D) model DB according to the present embodiment;
FIG. 10 is a diagram illustrating an example of a data structure of a skill recognition DB according to the present embodiment;
FIG. 13 is a diagram for describing an example of a relation between a motion posture name and motion posture success conditions;
FIG. 15 is a diagram illustrating an example of a data structure of a rule DB according to the present embodiment;
FIG. 16 is a diagram illustrating an example of a relation between a posture name and evaluation items;
FIG. 17 is a diagram illustrating an example of an arm angle of the cross;
FIG. 18 is a diagram illustrating an example of a waist bend angle.

DESCRIPTION OF EMBODIMENTS

However, the above-described related art has the problem that only one of the success or failure of a skill and the degree of perfection of the skill can be judged at a time in a scoring competition.

In a scoring competition, a referee judges the success or failure of a skill and the degree of perfection of the skill, based on an body orientation angle of a player, but, it is difficult to accurately measure the angle with human's eyes.

In addition, a rulebook used by referees includes many ambiguous expressions. For example, when a player stands still in a certain posture for 2 seconds, a strength hold element is successful, but, it is difficult for a human's body to completely stand still, and therefore, a certain degree of allowable margin is provided for strength hold elements, but there is no clear-criterion for judgement. Hence, it is difficult for referees to score players fairly. Furthermore, skills to be scored are more complicated, and accordingly, it is increasingly more difficult to score such skills fairly.

In one aspect, the embodiments provide a scoring method, a scoring program, and a scoring apparatus that make it possible to judge both the success or failure of a skill and the degree of perfection of the skill in a scoring competition.

Hereinafter, embodiments of a scoring method, a scoring program, and a scoring apparatus that are disclosed in the present invention will be described in detail with reference to the drawings. Note that the present invention is not limited by the embodiments.

Embodiments

Figure 1:
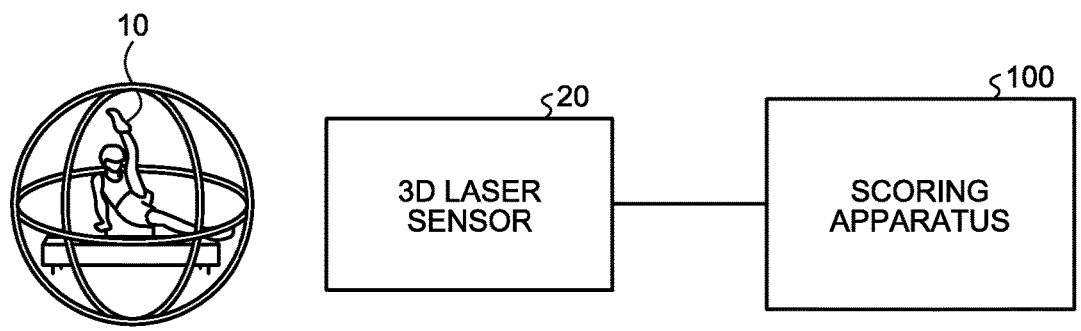
FIG. 1 is a diagram illustrating an example of a scoring system according to an embodiment.

FIG. 1 is a diagram illustrating an example of a scoring system according to the present embodiment. As illustrated in FIG. 1, the scoring system includes a 3D (3-dimensional) laser sensor 20 and a scoring apparatus 100. The scoring apparatus 100 is connected to the 3D laser sensor 20.

The 3D laser sensor 20 is a sensor that performs 3D sensing for a player 10. The 3D laser sensor 20 outputs sensor data as a sensing result to the scoring apparatus 100. Note that the 3D laser sensor 20 is an example of a distance image sensor capable of measuring a distance to the player 10.

For example, sensor data includes a plurality of frames, and each of the frames is assigned to a corresponding one of frame numbers in ascending order to uniquely identify the frame. Each of the frames includes information on distance from the 3D laser sensor 20 to points on the player 10. With the use of the sensor data, the three-dimensional positions of joints of the player 10 in each of the frames are estimated, whereby a 3D model of the player 10 can be created.

In front of the 3D laser sensor 20, the player 10 gives a predetermined performance to be scored. The player 10 is an example of a competitor. In the present embodiment, as an example, a description is given of a case in which the player 10 gives a gymnastic performance, but, the invention may be applied to other scoring competitions in the same manner.

Examples of the other scoring competitions include trampolining, diving events, figure skating, kata competitions of karate, social dancing, snowboarding, skateboarding, skiing aerial, and surfing. Furthermore, the present invention may be applied to check the form of classical ballet, ski jumping, air and turns of mogul skiing, baseball, and basketball. Furthermore, the present invention may be applied to other competitions such as kendo, judo, wrestling, and sumo. Furthermore, the present invention may be applied to evaluation whether a barbell has been successfully lifted in weightlifting competitions.

Artistic gymnastics are composed of consecutive motions. In the consecutive motions, a plurality of skills is consecutively present. At the beginning or during a performance of artistic gymnastics, a motion of "connection", which is not a skill, is sometimes present. By checking a skill, a posture of a basic motion constituting the skill, and a posture of a break between skills in a performance of artistic gymnastics, a referee judges the success or failure of the skill and the degree of perfection of the skill and makes an evaluation.

The "posture" used herein indicates a relative positional relation between a head, a trunk, and legs and arms. In the present embodiment, as an example, a posture in which a static state is maintained during a break between skills, for example, is expressed as a "static posture". In contrast, a posture with a motion is expressed as a "motion posture".

Figure 2:
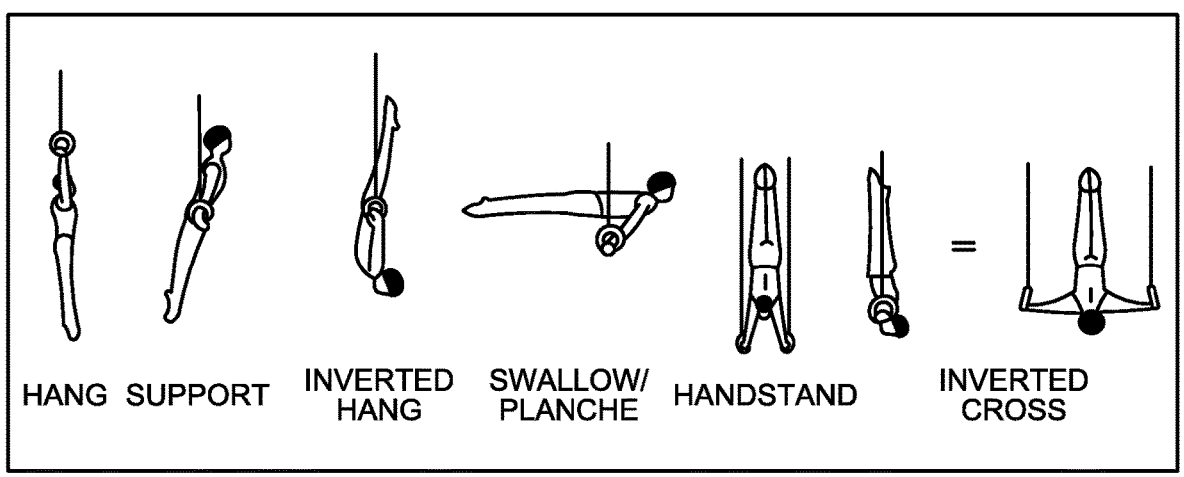
FIG. 2 is a diagram illustrating examples of static postures.

FIG. 2 is a diagram illustrating examples of static postures. The static postures are performed by the player 10 during a break between skills. Examples of the static postures include hang, support, inverted hang, swallow and Planche, handstand, and inverted cross. The static postures illustrated in FIG. 2 are merely examples, and other static postures are also present.

FIG. 3 is a diagram illustrating examples of motion postures. For example, (part of) a motion posture 1 of the still rings includes a swing (a first half) 1-1 and a swing (a second half) 1-2. A motion posture 2 of the vault includes a first phase 2-1 and a second phase 2-2.

Figure 4:
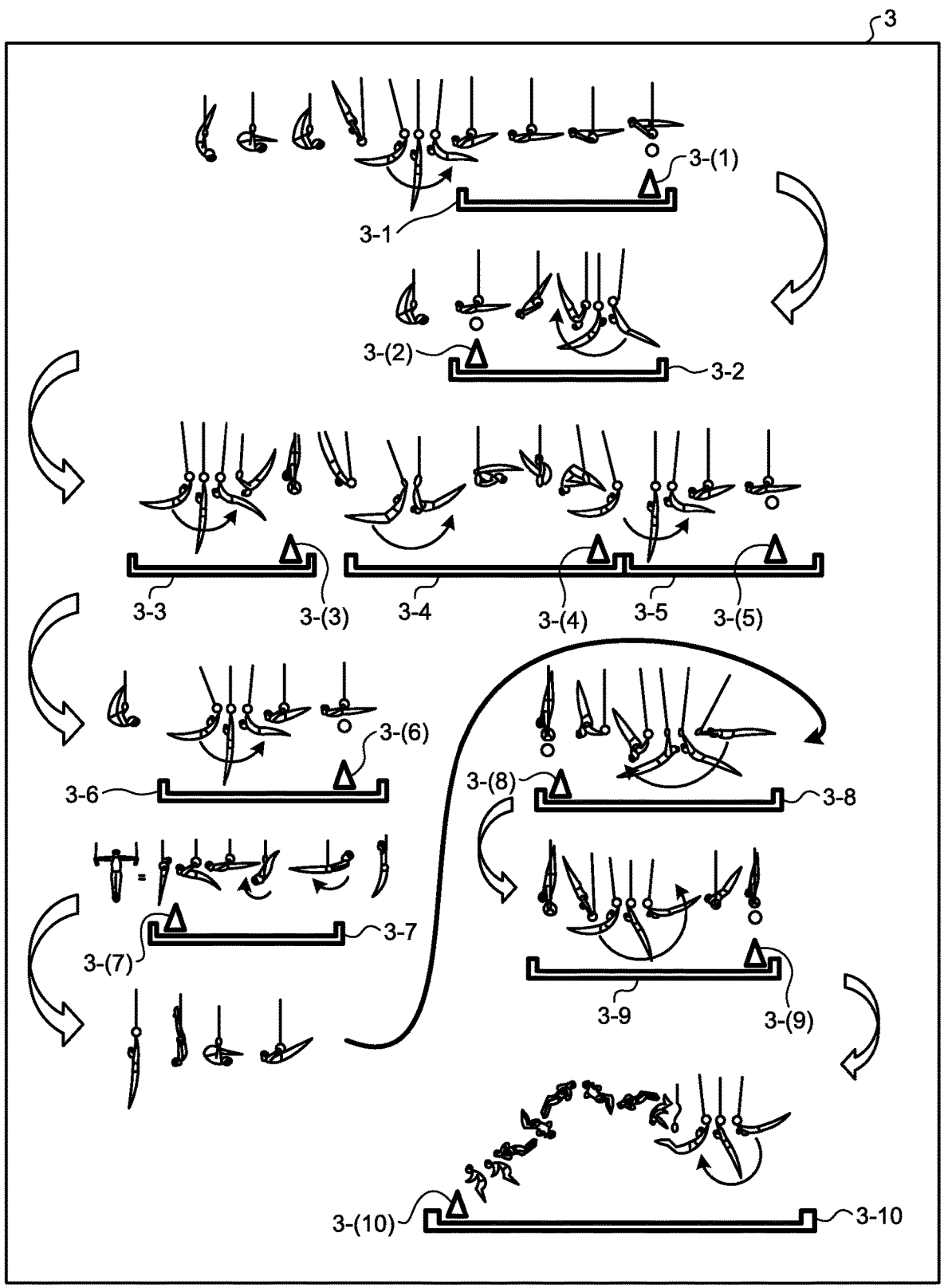
FIG. 4 is a diagram illustrating an example of a performance of the still rings.

FIG. 4 is a diagram illustrating an example of a performance of the still rings. As illustrated in FIG. 4, a performance 3 of the still rings includes motion postures 3-1 to 3-10.

The motion posture 3-1 corresponds to a skill "back uprise to swallow and Planche (2 seconds)". A static posture 3-(1) is included in a break of the skill of the motion posture 3-1.

The motion posture 3-2 corresponds to a skill "Felge to swallow (2 seconds)". A static posture 3-(2) is included in a break of the skill of the motion posture 3-2.

The motion posture 3-3 corresponds to a skill "back uprise to inverted cross". A static posture 3-(3) is included in a break of the skill of the motion posture 3-3.

The motion posture 3-4 corresponds to a skill "pike Yamawaki". A static posture 3-(4) is included in a break of the skill of the motion posture 3-4.

The motion posture 3-5 corresponds to a skill "back uprise to swallow (2 seconds)". A static posture 3-(5) is included in a break of the skill of the motion posture 3-5.

The motion posture 3-6 corresponds to a skill "back uprise to Planche (2 seconds)". A static posture 3-(6) is included in a break of the skill of the motion posture 3-6.

The motion posture 3-7 corresponds to a skill "Azarian". A static posture 3-(7) is included in a break of the skill of the motion posture 3-7.

The motion posture 3-8 corresponds to a skill "Felge to handstand (2 seconds)". A static posture 3-(8) is included in a break of the skill of the motion posture 3-8.

The motion posture 3-9 corresponds to a skill "Uprise to handstand (2 seconds)". A static posture 3-(9) is included in a break of the skill of the motion posture 3-9.

The motion posture 3-10 corresponds to a skill "double salto backward with 2/1 twist". A static posture 3-(10) is included in a break of the skill of the motion posture 3-10.

The description will be returned to FIG. 1. The scoring apparatus 100 is an apparatus to mark a difficulty (D) score and an execution (E) score for a performance given by a player 10. For example, based on sensor data on the player 10 who gives a performance, the scoring apparatus 100 extracts joint information of the player 10, and estimates postures (a static posture and a motion posture) taken during the performance given by the player 10. The scoring apparatus 100 acquires an evaluation item that indicates a point to be checked at the time of evaluating the estimated postures, and an evaluation index that indicates an index for evaluation of the evaluation item. The scoring apparatus 100 evaluates a skill in the performance of the player 10, based on the information on the joints of the player, the evaluation items, and the evaluation indexes.

FIG. 5 is a functional block diagram illustrating a configuration of the scoring apparatus according to the present embodiment. As illustrated in FIG. 5, the scoring apparatus 100 includes an interface unit 110, a communication unit 120, an input unit 130, a display unit 140, a storage unit 150, and a control unit 160.

The interface unit 110 is connected to the 3D laser sensor 20 and acquires sensor data from the 3D laser sensor 20. The interface unit 110 outputs the acquired sensor data to the control unit 160. Although not illustrated, the interface unit 110 may be connected to a camera that photographs pictures. The interface unit 110 outputs picture data to the control unit 160.

The communication unit 120 carries out data communications with other devices via a network. The communication unit 120 corresponds to a communication device. The scoring apparatus 100 may be connected to the 3D laser sensor 20 via a network. In this case, the communication unit 120 acquires sensor data from the 3D laser sensor 20 via the network.

The input unit 130 is an input device that inputs various kinds of information into the scoring apparatus 100. The input unit 130 corresponds to, for example, a keyboard, a mouse, or a touch panel.

The display unit 140 displays information on a display screen, the information having been outputted from the control unit 160. The display unit 140 corresponds to, for example, a liquid crystal display or a touch panel.

The storage unit 150 includes a sensing database (DB) 151, joint definition data 152, a joint position DB 153, a 3D model DB 154, a skill recognition DB 155, and a rule DB 156. The storage unit 150 corresponds to a semiconductor memory device such as a random access memory (RAM), a read only memory (ROM), or a flash memory, or a memory storage such as a hard disk drive (HDD).

The sensing DB 151 stores sensor data acquired from the 3D laser sensor 20. FIG. 6 is a diagram illustrating an example of a data structure of the sensing DB according to the present embodiment. As illustrated in FIG. 6, the sensing DB 151 associates a record identification (ID) with a frame number and a frame. The record ID is information to uniquely identify one performance given by the player 10. The frame number is a number to uniquely identify frames corresponding to an identical record ID. The frame is included in sensor data obtained by sensing with the 3D laser sensor 20.

Figures 7, 8:
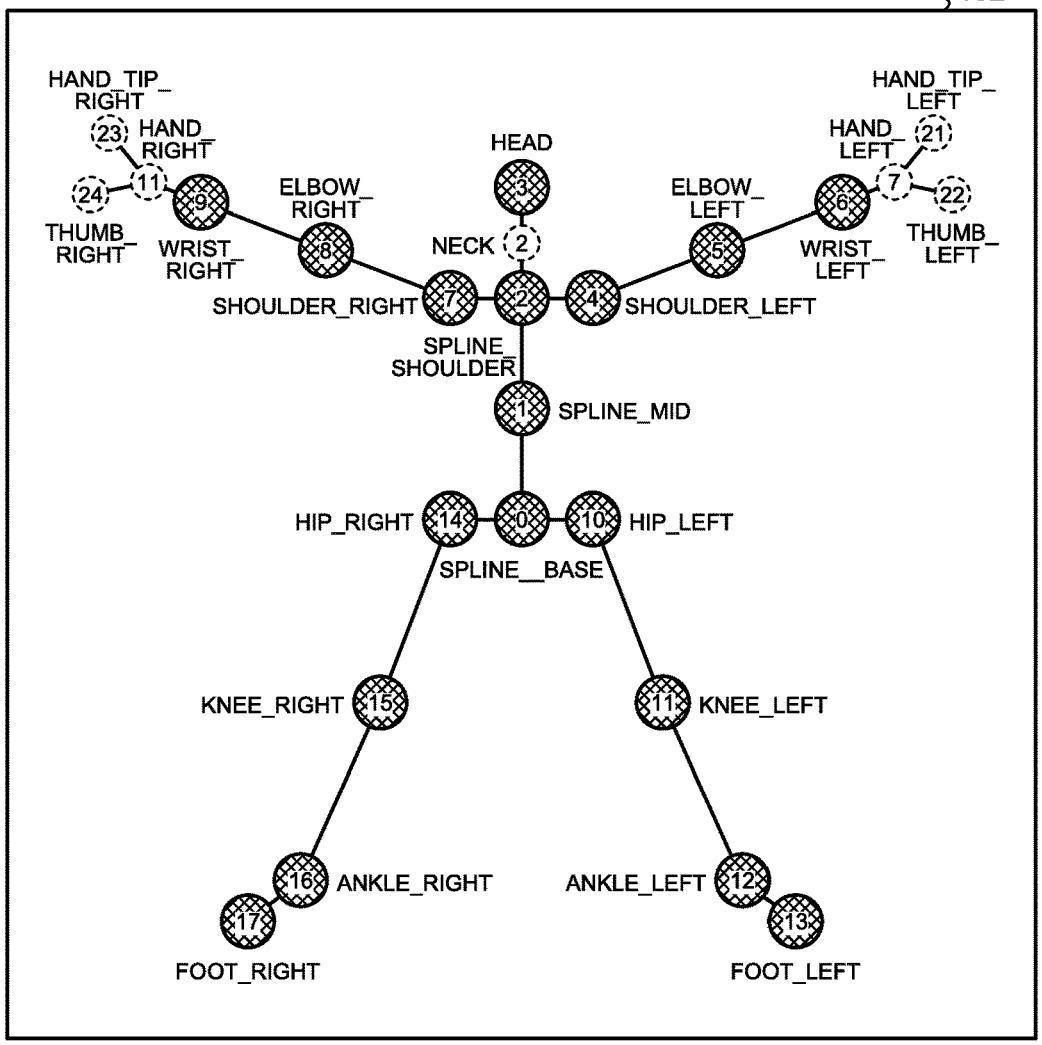
FIG. 7 is a diagram illustrating an example of joint definition data according to the present embodiment.
FIG. 8 is a diagram illustrating an example of a data structure of a joint position DB according to the present embodiment.

The joint definition data 152 defines positions of joints of a competitor (player 10). FIG. 7 is a diagram illustrating an example of the joint definition data according to the present embodiment. As illustrated in FIG. 7, the joint definition data 152 includes information on numbered joints specified with a well-known skeleton model. For example, as illustrated in FIG. 7, a right shoulder joint (SHOULDER_RIGHT) is numbered No. 7, a left elbow joint (ELBOW_LEFT) is numbered No. 5, a left knee joint (KNEE_LEFT) is numbered No. 11, and a right hip joint (HIP_RIGHT) is numbered No. 14. Here, in the present embodiment, the X coordinate, the Y coordinate, and the Z coordinate of the right shoulder joint No. 8 are sometimes represented by X8, Y8, and Z8, respectively. Note that a number encircled with a dotted line represents, for example, a joint that is not used for scoring although specified with the skeleton model.

The joint position DB 153 is position data of joints of the player 10, the position data being created based on sensing data of the 3D laser sensor 20. FIG. 8 is a diagram illustrating an example of a data structure of the joint position DB according to the present embodiment. As illustrated in FIG. 8, the joint position DB 153 associates a record ID with a frame number and "X0, Y0, Z0, . . . , X17, Y17, Z17". A description about the record ID is the same as the description about the sensing DB 151.

In FIG. 8, a frame number is to uniquely identify a sensing frame corresponding to an identical record ID. "X0, Y0, Z0, . . . , X17, Y17, Z17" represent the X, Y, and Z coordinates of joints. For example, "X0, Y0, Z0" represent the three-dimensional coordinates of joint No. 0 illustrated in FIG. 7.

FIG. 8 indicates time-series changes of joints in sensing data of a record ID "P101". In a frame number "1", positions of joints are "X0=100, Y0=20, Z0=0, . . . , X17=200, Y17=40, Z17=5". In a frame number "2", the positions of the joints are shifted to "X0=101, Y0=25, Z0=5, . . . , X17=202, Y17=39, Z17=15".

The 3D model DB 154 is a database to store information on a 3D model of the player 10, the 3D model being created based on sensor data. FIG. 9 is a diagram illustrating an example of a data structure of the 3D model DB according to the present embodiment. As illustrated in FIG. 9, the 3D model DB 154 associates a record ID with a frame number, skeleton data, and 3D model data. Descriptions about the record ID and the frame number are the same as the descriptions bout the sensing DB 151.

The skeleton data indicate a skeleton of the player 10, the skeleton being estimated by connecting positions of joints. The 3D model data are data on a 3D model of the player 10, the 3D model being estimated based on information acquired from the sensor data and the skeleton data.

The skill recognition DB 155 is used to recognize a skill (a static posture, a motion posture) included in a performance given by the player 10. FIG. 10 is a diagram illustrating an example of a data structure of the skill recognition DB according to the present embodiment. As illustrated in FIG. 10, the skill recognition DB 155 includes a table 155a and a table 155b.

The table 155a associates a static posture name with a static posture success condition. The static posture name represents a name that uniquely identifies a static posture. The static posture success condition represents a condition for success in the static posture. Hereinafter, a description is given of an example of a relation between the static posture name and the static posture success condition.

Figures 11, 12:
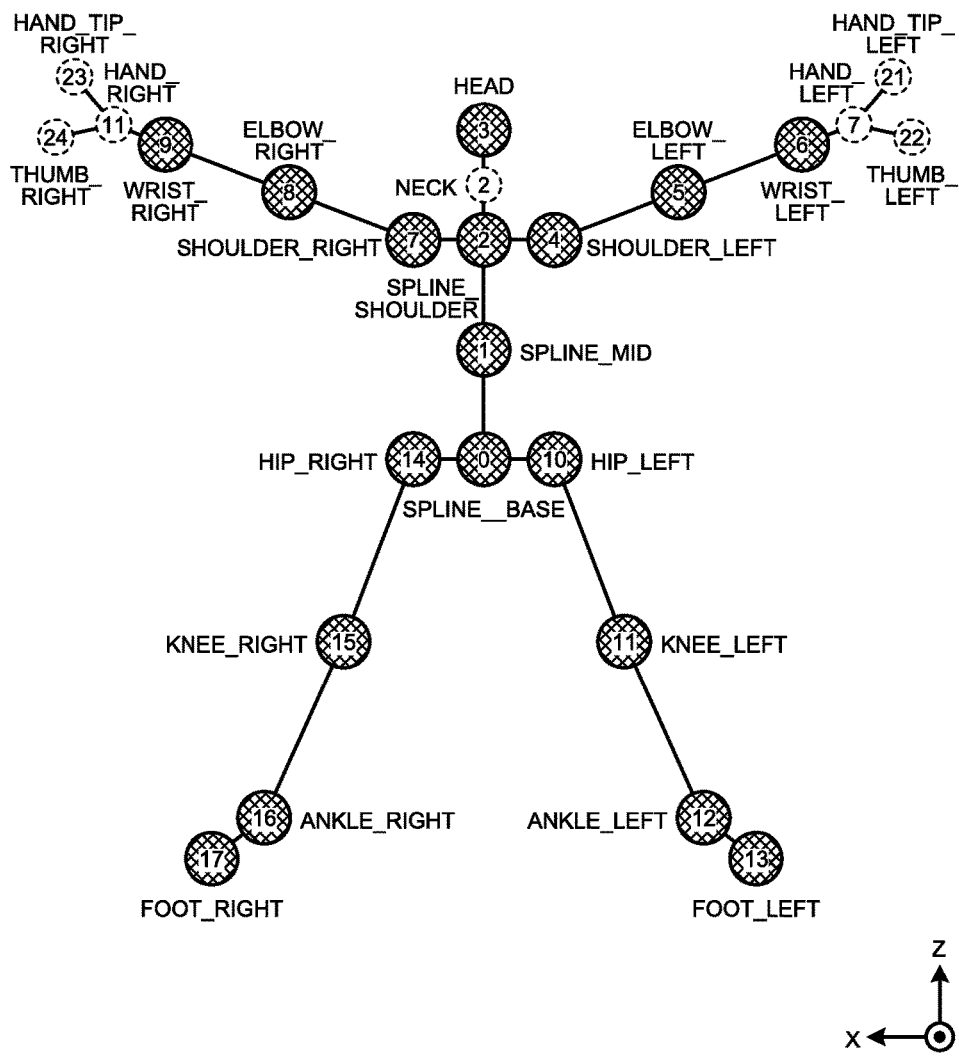
FIG. 11 is a diagram for describing an example of a relation between a static posture name and static posture success conditions.
FIG. 12 is a diagram for supplementarily describing angles in the static posture success conditions.

FIG. 11 is a diagram for describing an example of a relation between a static posture name and static posture success conditions. FIG. 12 is a diagram for supplementarily describing angles in the static posture success conditions.

As illustrated in FIG. 11, for example, a static posture name "the cross" is associated with static posture success conditions, "spine angle", "hip angle", "arm angle", "elbow angle", "knee angle", and "knees separation angle". Through the use of FIG. 12, a description is given of the "spine angle", the "hip angle", the "arm angle", the "elbow angle", the "knee angle", and the "knees separation angle".

The spine angle (Spine_Angle of an incline) is an angle formed by the Z axis and a line segment passing through joint No. 0 and joint No. 2. For example, a spine angle of "$\theta_{A1}$ or smaller" indicates that the center line of a competitor's body is along the vertically upward direction.

The hip angle (Hip_Angle between body) is an angle formed by a line segment passing through joint No. 0 and joint No. 1 and a line segment passing through joint No. 10 and joint No. 11. Alternatively, the hip angle is an angle formed by the line segment passing through joint No. 0 and joint No. 1 and a line segment passing through joint No. 14 and joint No. 15. For example, a hip angle of "$\theta_{A2}$ or larger" indicates that a competitor's waist is stretched.

The arm angle (Arm_Angle between body) is an angle formed by a line segment passing through joint No. 1 and joint No. 2 and a line segment passing through joint No. 4 and joint No. 5. Alternatively, the arm angle is an angle formed by the line segment passing through joint No. 1 and joint No. 2 and a line segment passing through joint No. 7 and joint No. 8. For example, an arm angle of "$\theta_{A31}$ to $\theta_{A32}$" indicates that a competitor's arm is horizontally stretched.

The elbow angle (Elbow_Angle) is an angle formed by the line segment passing through joint No. 4 and joint No. 5 and a line segment passing through joint No. 5 and joint No. 6. Alternatively, the elbow angle is an angle formed by a line segment passing through joint No. 7 and joint No. 8 and a line segment passing through joint No. 8 and joint No. 9. For example, an elbow angle of "$\theta_{A5}$ or larger" indicates that a competitor's elbow is stretched.

The knee angle, (Knee_Angle) is an angle formed by a line segment passing through joint No. 10 and joint No. 11 and a line segment passing through joint No. 11 and joint No. 12. Alternatively, the knee angle is an angle formed by a line segment passing through joint No. 14 and joint No. 15 and a line segment passing through joint No. 15 and joint No. 16. For example, a knee angle of "$\theta_{A5}$ or larger" indicates that a competitor's knee is stretched.

The knees separation angle (Knees_sep. Angle) is an angle formed by the line segment passing through joint No. 10 and joint No. 11 and a straight line passing through joint No. 14 and joint No. 15. For example, a knees separation angle of "$\theta_{A6}$" indicates that competitor's legs are not opened.

For example, in the example illustrated in FIG. 11, when all of the success conditions that the spine angle be "$\theta_{A1}$ or smaller", the hip angle be "$\theta_{A2}$ or larger", the arm angle be "$\theta_{A31}$ to $\theta_{A32}$", the elbow angle be "$\theta_{A5}$ or larger", the knee angle be "$\theta_{A5}$ or larger", and the knees separation angle be "$\theta_{A6}$ or smaller" are satisfied, "the cross" is given as a static posture name.

The table 155b associates a motion posture name with a motion posture success condition. The motion posture name represents a name that uniquely identifies a motion posture. The motion posture success condition represents a condition for success in the motion posture.

Figure 14:
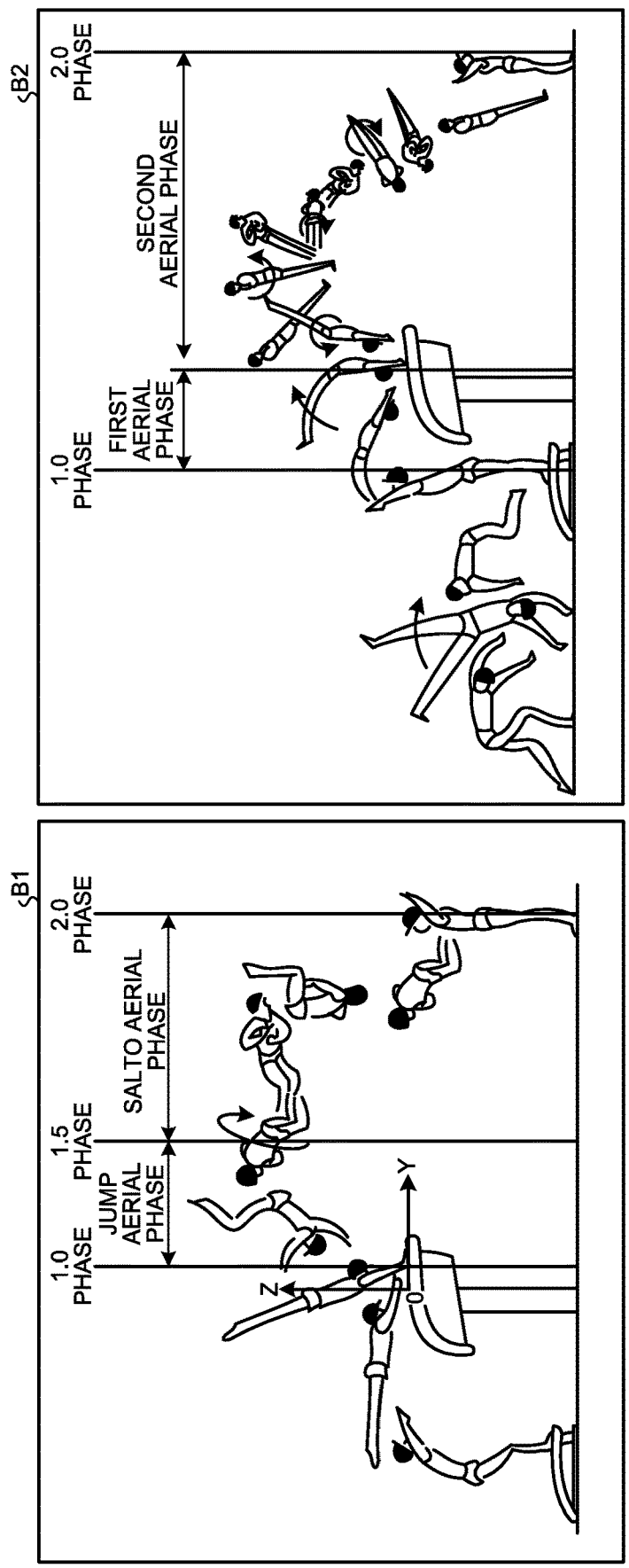
FIG. 14 is a diagram for supplementarily describing the motion posture success conditions.

FIG. 13 is a diagram for describing an example of a relation between a motion posture name and motion posture success conditions. FIG. 14 is a diagram for supplementarily describing the motion posture success conditions.

As illustrated in FIG. 13, for example, a motion posture name "B1" is associated with motion posture success conditions "twist angle at takeoff" "the number of saltos", "stretch or bend posture", "the number of twists at a 1.0 phase", "the number of twists at a 1.5 phase", and "the number of twists at a 1.5 to 2.0 phase".

A series of player's motions corresponding to the motion posture B1 (Cuervo with 1/1 twist; another name: handspring forward with twist and salto backward tuck with 1/1 twist) is illustrated in the B1 in FIG. 14. The motion posture B1 is divided into a 1.0 phase, a 1.5 phase, and a 2.0 phase. The motion posture B1 bears the motion posture success conditions that the twist angle at the time of takeoff be "$\theta_{B1}$", the number of saltos be "$m_{11}$ times", and the stretch or bend posture be "tuck". The motion posture B1 further bears the motion posture success conditions that the number of twists at the 1.0 phase be "$m_{12}$ times", the number of twists at the 1.5 phase be "$m_{13}$ times", and the number of twists at the 1.5 to 2.0 phase be "$m_{14}$ times".

A series of player's motions corresponding to a motion posture B2 (Yurchenko stretched with 7/2 twist) is illustrated in the B2 in FIG. 14. The motion posture B2 is divided into a 1.0 phase and a 2.0 phase, and does not have a 1.5 phase. The motion posture B2 bears motion posture success conditions that the twist angle at takeoff be "$\theta_{B2}$", the number of saltos be "$m_{21}$ times" and the stretch or bend posture be "stretch". The motion posture B2 further bears motion posture success conditions that the number of twists at the 1.0 phase be "$m_{23}$ times" and the number of twists at the 1.5 to 2.0 phase be "$m_{24}$ times".

The description will be returned to FIG. 5. The rule DB 156 is a DB that associates an evaluation item (a point to be checked) for marking the D and E scores related to a posture with an evaluation index. FIG. 15 is a diagram illustrating an example of a data structure of the rule DB according to the present embodiment. As illustrated in FIG. 15, the rule DB 156 associates a posture name with an evaluation item and an evaluation index.

The posture name represents a static posture name or a name of a certain posture included in a motion posture. The evaluation item represents a point to be checked when the D and E scores related to a posture are marked. The evaluation index represents an index (marking criterion) used when the D score and the E score are marked for evaluation items.

FIG. 16 is a diagram illustrating an example of a relation between a posture name and evaluation items.

The evaluation items represent points to be checked used when the D score and the E score are marked. Examples of the evaluation items include a horizontal angle, the arm angle of the cross, a shoulder position at the time when a swing is stopped, a deviation in an L-support angle, a deviation in a handstand angle, twist, and turn. A circle mark is assigned to an evaluation item related to a posture. For example, if a posture is "the cross", then an evaluation item is "the arm angle of the cross."

Examples of the evaluation items further include shoulder, waist, elbow, knee, tiptoe, leg opening, deep grip, and excessive cable swing. A circle mark is assigned to an evaluation item related to a posture. For example, a posture is "the cross", then judgement items are shoulder, waist, elbow, knee, tiptoe, leg opening, deep grip, and excessive cable swing.

As an example, a description is given of an evaluation item "the arm angle of the cross". FIG. 17 is a diagram illustrating an example of the arm angle of the cross. The arm angle of the cross corresponds to an arm angle $\theta 1_R$ of a right arm and an arm angle $\theta 1_L$ of a left arm. Joints (4) (6), (7), and (9) of the player 10 illustrated in FIG. 17 correspond to joint numbers 4, 6, 7, and 9 described in FIG. 7, respectively. The arm angle $\theta 1_R$ is calculated using Equation (1a). The arm angle $\theta 1_L$ is calculated using Equation (2a).

$$\theta 1_L = \mathrm{asin}[Z4-Z6]/\mathrm{sqrt}\{(X6-X4)^2+(Y6-Y4)^2+(Z6-Z4)^2\} \quad (1a)$$

$$\theta 1_R = \mathrm{asin}[Z7-Z9]/\mathrm{sqrt}\{(X9-X7)^2+(Y9-Y7)^2+(Z9-Z7)^2\} \quad (2a)$$

Note that the same equations are applied to the cross and the inverted cross. When the angle of the cross is calculated, a calculated value is sometimes negative, and, in this case, the absolute value of the calculated value is used.

As an example, a description is given of "a waist bend angle" corresponding to an evaluation item "waist". FIG. 18 is a diagram illustrating an example of a waist bend angle. Joints (0), (2), (4), (7), (10), (11), (14), and (15) of the player 10 illustrated in FIG. 18 correspond to joint numbers 0, 2, 4, 7, 10, 11, 14, and 15 described in FIG. 7, respectively. Here, for the convenience of description, a description is given of a case in which an angle $\theta 2_L$ formed by a line segment connecting the waist (0) and the central point between shoulders (2) and a line segment connecting to the left heel (10) and the left knee (11) is calculated. For example, when the player 10 stretches out his/her body straight, the angle $\theta 2_L$ is 180°. When the player 10 bends his/her body through 90°, the angle $\theta 2_L$ is 90°.

A waist bend angle is determined in such a manner that the absolute value of the angle is determined based on Equation (3a), from the principle of an inner product of vectors, and the sign of the angle is calculated based on Equation (4a). Furthermore, Lx, Ly, and Lz in Equation (4a) are defined by Equations (5a) to (7a), respectively.

$$|\theta 2_L| = \mathrm{acos}[(X11-X10)(X2-X0)+(Y11-Y10)(Y2-Y0)+(Z11-Z10)(Z2-Z0)/\mathrm{sqrt}\{(X11-X10)2+(Y11-Y10)2+(Z11-Z10)2\}\{(X2-X0)2+(Y2-Y0)2+(Z2-Z0)2\}] \quad (3a)$$

$$\text{Sign of angle} = \mathrm{sign}[Lx(X14-X10)+Ly(Y14-Y10)+Lz(Z14-Z10)] \quad (4a)$$

$$Lx=(Y11-Y10)(Z2-Z0)-(Z11-Z10)(Y2-Y0) \quad (5a)$$

$$Ly=(Z11-Z10)(X2-X0)-(X11-X10)(Z2-Z0) \quad (6a)$$

$$Lz=(X11-X10)(Y2-Y0)-(Y11-Y10)(X2-X0) \quad (7a)$$

Figures 19, 20:
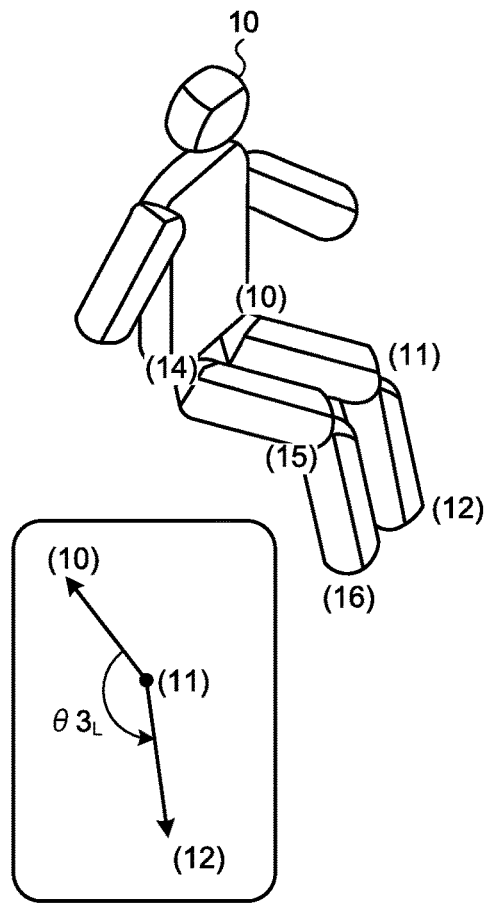
FIG. 19 is a diagram illustrating an example of a knee bend angle.
FIG. 20 is a diagram illustrating an example of a relation between an evaluation item and evaluation indexes.

A description is given of "a knee bend angle" corresponding to an evaluation item "knee". FIG. 19 is a diagram illustrating an example of a knee bend angle. Joints (10), (11), (12), (14), (15), and (16) of the player 10 illustrated in FIG. 19 correspond to joint numbers 10, 11, 12, 14, 15, and 16 described in FIG. 7, respectively. Here, for the convenience of description, an angle formed by a line segment connecting the left waist (10) and the left knee (11) and a line segment connecting the left knee (11) and the left heel (12) is taken as $\theta 3_L$. The angle $\theta 3_L$ is calculated using Equation (8a).

$$\theta 3_L = \mathrm{acos}[(X10-X11)(X12-X11)+(Y10-Y11)(Y12-Y11)+(Z10-Z11)(Z12-Z11)/\mathrm{sqrt}\{(X10-X11)2+(Y10-Y11)2+(Z10-Z11)2\}\{(X12-X11)2+(Y12-Y11)2+(Z12-Z11)2\}] \quad (8a)$$

An angle formed by a line segment connecting the right waist (14) and the right knee (15) and a line segment connecting the right knee (15) and the right heel (16) is taken as $\theta 3_R$. $\theta 3_R$ is calculated using Equation (9a). Illustration of $\theta 3_R$ will be omitted.

$$\theta 3_R = \mathrm{acos}[(X14-X15)(X16-X15)+(Y14-Y15)(Y16-Y15)+(Z14-Z15)(Z16-Z15)/\mathrm{sqrt}\{(X14-X15)2+(Y14-Y15)2+(Z14-Z15)2\}\{(X16-X15)2+(Y16-Y15)2+(Z16-Z15)2\}] \quad (9a)$$

The description will be moved to a description about an evaluation index corresponding to an evaluation item in FIG. 15. FIG. 20 is a diagram illustrating an example of a relation between an evaluation item and an evaluation index. As illustrated in FIG. 20, the evaluation index includes a D evaluation index and an E evaluation index, and is associated with an evaluation item. The D evaluation index is an index to judge the success or failure of a skill. For example, when an evaluation item "the arm angle of the cross" is larger than "45°", the skill is unsuccessful.

The E evaluation index defines the number of points deducted in the E score in accordance with a value of an evaluation item. For example, when an evaluation item "the arm angle of the cross" corresponds to "1° to 15°", "0.1" points are deducted from the E score. When the evaluation item "the arm angle of the cross" corresponds to "16° to 30°", "0.3" points are deducted from the E score. When the evaluation item "the arm angle of the cross" corresponds to "31° to 45°", "0.5" points are deducted from the E score.

The description will be returned to FIG. 5. The control unit 160 includes a registration unit 161, an extraction unit 162, a 3D model creation unit 163, an evaluation unit 164, and an output unit 165. The control unit 160 may be achieved by, for example, a central processing unit (CPU) or a micro processing unit (MPU). Furthermore, the control unit 160 may also be achieved by a hard wired logic, such as an application specific integrated circuit (ASIC) or a field programmable gate array (FPGA).

The registration unit 161 is a processing unit that acquires sensor data from the 3D laser sensor 20 and registers the acquired sensor data in the sensing DB 151. When registering sensor data (a frame number, a frame) in the sensing DB 151, the registration unit 161 associates a record ID with the sensor data. The record ID is added to the sensor data, for example. Note that a user may operate the input unit 130 to input a record ID corresponding to sensor data.

The extraction unit 162 is a processing unit that analyzes sensor data stored in the sensing DB 151, and, based on a result of the analysis, extracts position data on joints of the player 10 on a time-series basis. The extraction unit 162 stores a result of the extraction in the joint position DB 153.

For example, the extraction unit 162 compares a frame in the sensing DB 151 with a positional relation between joints defined in the joint definition data 152, and identifies the kinds of the joints included in the frame and the three-dimensional coordinates of the joints. The extraction unit 162 repeatedly executes the above-described processing for every frame number to create the joint position DB 153.

The 3D model creation unit 163 is a processing unit that creates 3D model data corresponding to a frame number, based on the joint position DB 153. The 3D model creation unit 163 associates the created 3D model data with a record ID and a frame number, and stores the 3D model data in the 3D model DB 154.

For example, the 3D model creation unit 163 creates skeleton data by linking together the three-dimensional coordinates of joints stored in the joint position DB 153, based on connection relations defined in the joint definition data 152. Furthermore, the 3D model creation unit 163 creates 3D model data by applying estimated skeleton data to a skeleton model created to fit the physique of a player 10. The 3D model creation unit 163 creates the 3D model DB 154 by repeatedly executing the above-described processing for every frame number of a record ID. The 3D model creation unit 163 associates the skeleton data with the 3D model data, and stores the skeleton data in the 3D model DB 154.

The evaluation unit 164 identifies postures (a static posture, a motion posture) of the player 10, based on a series of joint motions stored in the joint position DB 153 and the skill recognition DB 155. Furthermore, based on the identified postures and the rule DB 156, the evaluation unit 164 identifies evaluation items respectively corresponding to the postures, and evaluates the D score and the E score, based on evaluation indexes corresponding to the evaluation items and analysis results of the postures. The D score is a score based on the success or failure of a skill during a performance of the player 10. The E score is a score based on the degree of perfection of the skill during the performance of the player 10.

First, a description is given of an example of processing in which the evaluation unit 164 identifies postures of the player 10. The evaluation unit 164 compares a static posture success condition in the table 155a of the skill recognition DB 155 with joint positions in every frame number, and, when values based on the joint positions satisfy the static posture success condition, the evaluation unit 164 judges that, in the frame number, a static posture corresponding to the frame number has been successful.

The values based on the joint positions correspond to, for example, a spine angle, a hip angle, an arm angle, an elbow angle, a knee angle, and a knees separation angle, which are described in FIG. 11.

For example, regarding a frame number n, a spine angle is "$\theta_{A1}$ or smaller", and a hip angle is "$\theta_{A2}$ or larger". Furthermore, regarding the frame number n, an arm angle is "$\theta_{A31}$ to $\theta_{A32}$", an elbow angle is "$\theta_{A4}$ or larger", a knee angle is "$\theta_{A5}$ or larger", and a knees separation angle is "$\theta_{A6}$ or smaller". In this case, since a static posture success condition is satisfied in the frame number n, the evaluation unit 164 judges that a static posture having a static posture name "the cross" has been successful.

Furthermore, the evaluation unit 164 compares a motion posture success condition in the table 155b of the skill recognition DB 155 with a shift in joint positions between certain frames, and as a result, when the shift in the joint positions satisfies the motion posture success condition, the evaluation unit 164 judges that, in the frames, a motion posture corresponding to the frames has been successful.

The shift in joint positions corresponds to a twist angle at the time of takeoff, the number of saltos, a stretch or bend posture, the number of twists at the 1.0 phase, the number of twists at the 1.5 phase, and the number of twists at the 1.5 to 2.0 phase, which are described in FIG. 13.

For example, in a shift in joint positions in a frame number m to a frame number m+1, a twist angle at the time of takeoff "$\theta_{B1}$", the number of saltos "$m_{11}$ times", and a stretch or bend posture "tuck" are included. In the shift in joint positions in the frame number m to frame number m+1, the number of twists at the 1.0 phase "$m_{12}$ times", the number of twists at the 1.5 phase "$m_{13}$ times", and the number of twists at the 1.5 to 2.0 phase "$m_{14}$ times" are further included. In this case, since a motion posture success condition is satisfied in the frame number m to the frame number m+1, the evaluation unit 164 judges that a motion posture having a motion posture name "motion posture B1" has been successful.

Figure 21:
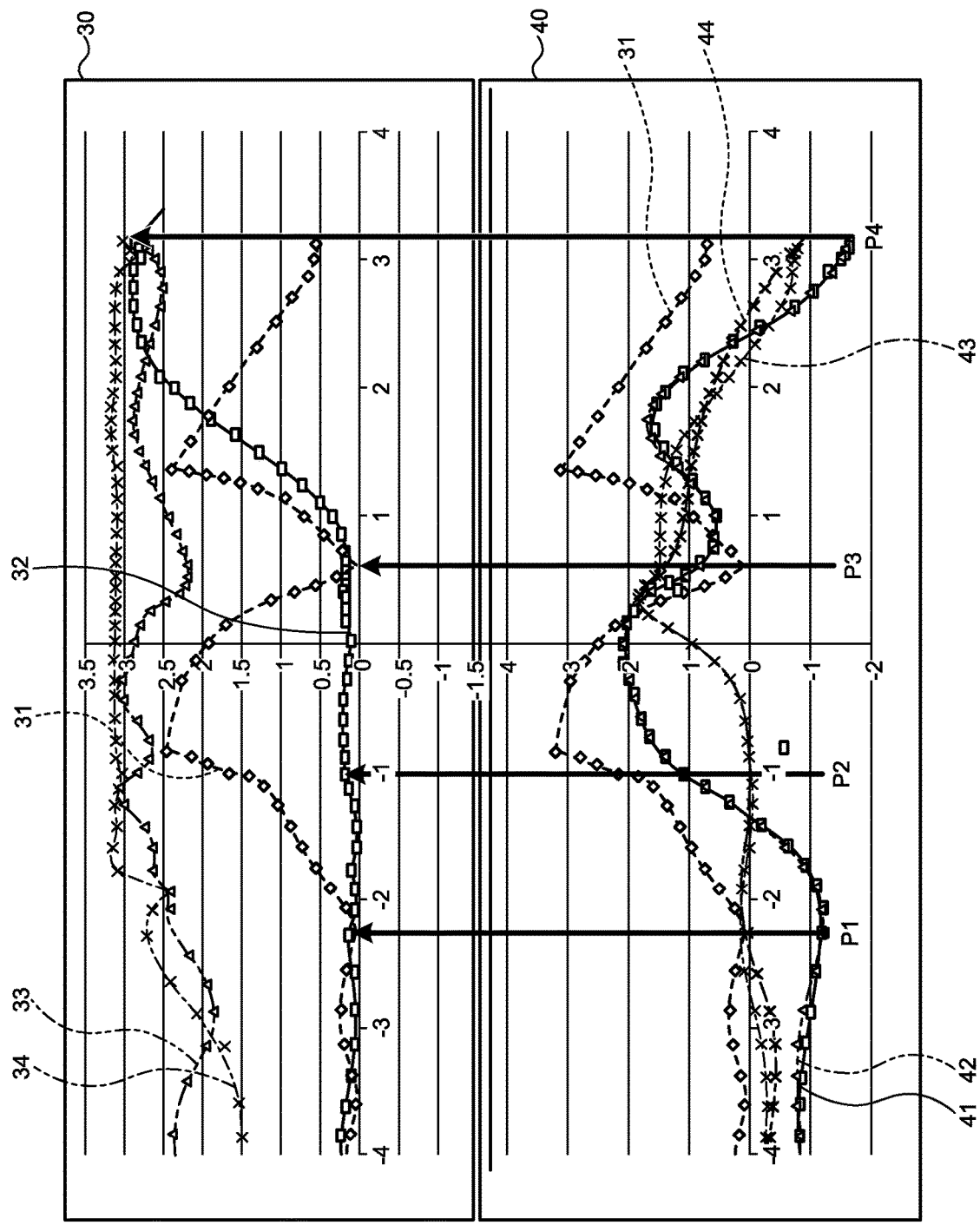
FIG. 21 is a diagram for describing an example of processing in which an evaluation unit recognizes a posture according to the present embodiment.

FIG. 21 is a diagram for describing an example of processing in which the evaluation unit according to the present embodiment recognizes a posture. FIG. 21 illustrates a graph 30 and a graph 40. The horizontal axis of each of the graphs 30 and 40 is an axis corresponding to a run-up direction of joint No. 0. The vertical axis of the graph 30 is an axis corresponding to a joint angle. The vertical axis of the graph 40 is an axis corresponding to a joint position with respect to the center of a vault surface as a starting point.

A line segment 31 of the graph 30 indicates a rotation angle of the player 10. For example, the rotation angle is an arccos angle (angle history) formed by the Z-axis and a projection vector obtained by projecting a first vector onto a Y-Z plane. The first vector is a vector from joint No. 1 to joint No. 0.

A line segment 32 of the graph 30 indicates a twist angle of the player 10. For example, the twist angle is an arccos angle (angle history) formed by the X-axis and a projection vector obtained by projecting a second vector onto an X-Y plane. The second vector is a vector from joint No. 14 to joint No. 10.

A line segment 33 of the graph 30 corresponds to a waist angle of the player 10. For example, the waist angle is a smaller angle (angle history) among an angle formed by the first vector and a third vector and an angle formed by the first vector and a fourth vector. The third vector is a vector from joint No. 10 to joint No. 11. The fourth vector is a vector from joint No. 14 to joint No. 15.

A line segment 34 of the graph 30 corresponds to a knee angle of the player 10. For example, the knee angle is a smaller angle (angle history) among an angle formed by the third vector and a fifth vector and an angle formed by the fourth vector and a sixth vector. The fifth vector is a vector from joint No. 11 to joint No. 12. The sixth vector is a vector from joint No. 15 to joint No. 16.

A line segment 31 of the graph 40 is the same as the line segment 31 of the graph 30. A line segment 41 of the graph 40 corresponds to a shift in the Z coordinate of the right heel (joint No. 16) of the player 10. A line segment 42 of the graph 40 corresponds to a shift in the Z coordinate of the left heel (joint No. 12) of the player 10. A line segment 43 of the graph 40 corresponds to a shift in the Z coordinate of the right wrist (joint No. 9) of the player 10. A line segment 44 of the graph 40 corresponds to a shift in the Z coordinate of the left wrist (joint No. 6) of the player 10.

The evaluation unit 164 judges the phases, based on relations in the graph 40. For example, the evaluation unit 164 determines a takeoff point P1 and a landing point P4 by comparing the line segments 41 and 42 (heel position) with a predetermined threshold. The evaluation unit 164 determines a point P2 of a touch with both hands by comparing the line segment 43 (wrist position) and a predetermined threshold. The evaluation unit 164 determines, as a point in the 1.5 phase, a point P3 at which the line segment 32 forms an angle of 0° within a range of positive values on the vertical axis. Frame numbers corresponding to the above-described points P1, P2, P3, and P4 correspond to a takeoff, a touch with both hands (the 1.0 phase), the 1.5 phase, the timing of (at the time of) landing (the 2.0 phase), respectively.

The evaluation unit 164 judges the number of rotations and the number of twists, based on relations in the graph 30. The number of rotations and the number of twists can be calculated by dividing the number of turns at an arccos angle (0 to π) by 2. Alternatively, the evaluation unit 164 may calculate the number of rotations and the number of twists by dividing an accumulated value of angle change in each of the vectors by 2π. The evaluation unit 164 calculates the number of saltos by subtracting the number of jump rotations, that is, 1, from the number of rotations.

In the graph 30 in FIG. 21, "the number of twists" is "0 times" at the takeoff P1, "0 times" at the touch-with-both-hands P2 (1.0 phase), "0 times" at the P3 in the 1.5 phase, and "0.5 times" at the P4 in the 2.0 phase. Furthermore, the number of saltos is "1 time".

Note that the evaluation unit 164 judges a stretch or bend posture by referring waist and knee angles in an evaluation section. For example, when a posture with a waist angle of 135° or larger and a knee angle of 90° or larger is defined as a posture of a stretched body, the evaluation unit 164 judges, based on the graph 30, that a stretch or bend posture of the player 10 is a "bending posture".

The evaluation unit 164 determines a motion posture name by comparing information of the above-mentioned graphs 30 and 40 with a motion posture success condition in the table 155b. For example, a motion posture name corresponding to the graphs 30 and 40 corresponds to the motion posture B1 in FIG. 13.

By executing the above-described processing, the evaluation unit 164 identifies a "static posture" and a "motion posture" that are included in a performance of the player 10. The evaluation unit 164 identifies evaluation items corresponding to the postures, based on the identified postures and the rule DB 156, and evaluates the D score and the E score, based on evaluation indexes in accordance with the evaluation items and analysis results of the postures.

A description is given of an example of processing in which the evaluation unit 164 evaluates the D score. By comparing a posture name identified through the above-mentioned processing (a posture included in the static posture or the motion posture) with the rule DB 156, the evaluation unit 164 acquires an evaluation item corresponding to the posture name and a D evaluation index.

For example, as described with FIG. 16, "the arm angle of the cross" is used as an evaluation item corresponding to a posture name "the cross". As described with FIG. 20, a failure condition indicated with a D evaluation index corresponding to the evaluation item "the arm angle of the cross" is "the arm angle of the cross exceeds 45°". From the joint position DB 153, the evaluation unit 164 acquires joint position data corresponding to a frame number identified as the posture name "the cross", and calculates the arm angle of the cross. When the arm angle of the cross is smaller than 45°, the evaluation unit 164 judges that the cross has been successful (confirms the cross). The evaluation unit 164 may judge whether the cross has been successful, by using another evaluation item besides the evaluation item "the arm angle of the cross".

In the same manner as for a static posture, the evaluation unit 164 evaluates the success or failure of a skill for postures (for example, an element posture) included in a motion posture. Examples of the element posture include a twist angle and a tuck posture. When postures included in a motion posture have been successful, the evaluation unit 164 judges that the identified motion posture has been successful.

By executing the above-described processing, the evaluation unit 164 confirms a skill (a posture) performed by the player 10, and gives the D score in accordance with to the confirmed skill.

Subsequently, a description is given of an example of a processing in which the evaluation unit 164 evaluates the E score. For a skill (a posture) confirmed through the evaluation of the D score, the evaluation unit 164 evaluates the E score by point deduction scoring, based on how much a posture under a player's actual performance deviates from an ideal posture for the confirmed skill. For example, an initial value of the E score is "10".

For example, as described with FIG. 16, an evaluation item "the arm angle of the cross" corresponding to a confirmed posture name "the cross" is used. As described with FIG. 20, an E evaluation index corresponding to the evaluation item "the arm angle of the cross" indicates the followings. When "the arm angle of the cross" is in a range of "1° to 15°", the evaluation unit 164 deducts "0.1" from the E score. When "the arm angle of the cross" is in a range of "16° to 30°", the evaluation unit 164 deducts "0.3" from the E score. When "the arm angle of the cross" is in a range of "31° to 45°", the evaluation unit 164 deducts "0.5" from the E score.

In the same manner as for a static posture, the evaluation unit 164 evaluates the E score for postures (for example, an element posture) included in a motion posture by point deduction scoring, based on an ideal posture and how much a posture under a player's actual performance deviates from the ideal posture.

Figure 22:
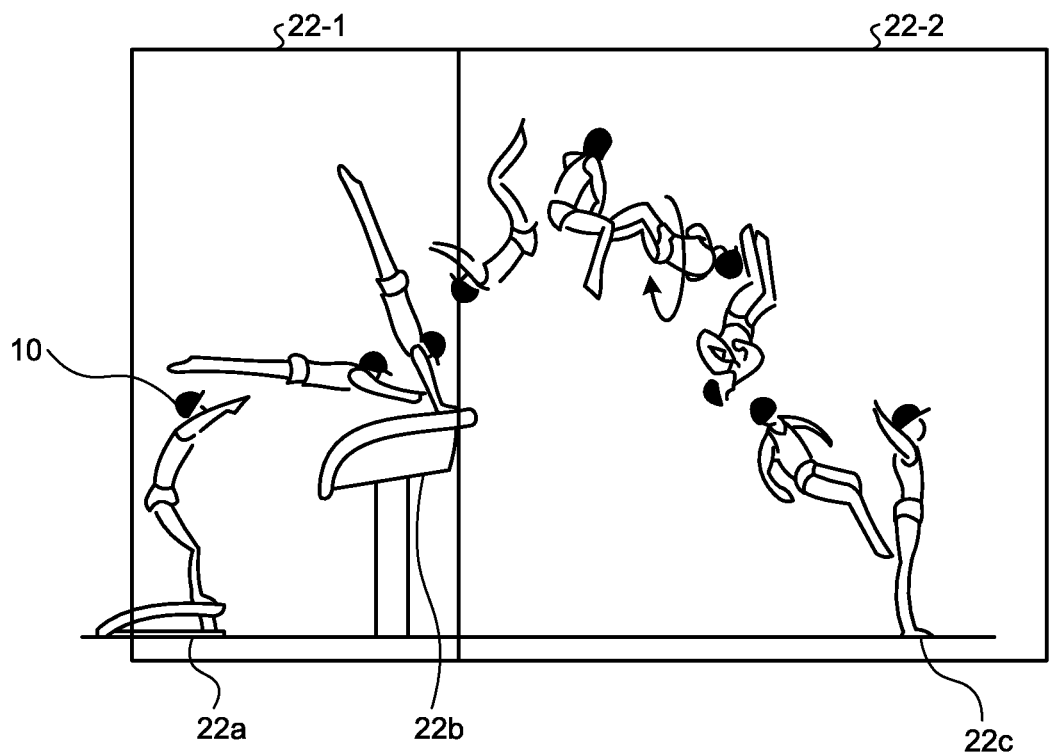
FIG. 22 is a diagram illustrating an example of a performance of the vault.

Here, a description is given of an example in which the evaluation unit 164 marks the D score and the E score of a performance of the vault. FIG. 22 is a diagram illustrating an example of a performance of the vault. For a performance of the vault illustrated in FIG. 22, the kind of a skill is determined by a posture (the kind of a motion) in a first phase 22-1 and a posture (the kind of a motion) in a second phase 22-2. The first phase 22-1 is a phase from a takeoff 22a of a player to a touch on a vault 22b with hands of the player. The second phase 22-2 is a phase from the player's pushing off of the vault 22b to landing on a mat 22c.

A condition for the approval of a skill is basically such that a predetermined element is included in a motion. The skill illustrated in FIG. 22 is "handspring forward and salto forward tuck with 1/1 twist". This skill is such that, in the first phase 22-1, the player 10 touches the valut with both hands with facing front, without a twist, for example. In the second phase 22-2, the player 10 performs a twist motion (360°) once during one salto in the flight, and makes landing with legs. During the salto in the air, the player takes a tuck posture in which the player bends the player's waist and knees. When determining that the skill "handspring forward and salto forward tuck with 1/1 twist" has been successful, the evaluation unit 164 gives "3.2" as the D score.

Here, evaluation items for the skill "handspring forward and salto forward tuck with 1/1 twist" are "the degree of a twist in the second phase" and "a tuck posture during a salto". A value of the D score is corrected based on D evaluation indexes corresponding to the evaluation items.

A description is given of an evaluation of the D score for "the degree of a twist in the second phase". For example, a D evaluation index corresponding to the evaluation item "the degree of a twist in the second phase" is "within a range of 270° to 450°". Furthermore, the tolerance is ±90°. When the angle of a twist is within a range of 90° to 270°, the evaluation unit 164 corrects, for a successful skill, "handspring forward and salto forward tuck with 1/1 twist" to "handspring forward and salto forward tuck with twist" (decreases the difficulty), and corrects "3.2" for the D score to "2.8".

In contrast, when the angle of a twist is within a range of 450° to 540°, the evaluation unit 164 corrects, for a successful skill, "handspring forward and salto forward tuck with 1/1 twist" to "handspring forward and salto forward tuck with 3/2 twist" (increases the difficulty), and corrects "3.2" for the D score to "4.0".

A description is given of an evaluation of the D score for "tuck posture". The evaluation unit 164 judges a "tuck posture", based on a knee bend angle and a waist bend angle of the player 10. For example, a D evaluation index corresponding to the evaluation item "tuck posture" is "a waist bend angle of 45° or larger and a knee bend angle of 90° or larger". When a waist bend angle is smaller than 45°, the evaluation unit 164 corrects, for a successful skill, "handspring forward and salto forward tuck with 1/1 twist" to "handspring forward and salto forward stretch with 1/1 twist", and corrects "3.2" for the D score to "4.4".

When a knee bend angle is smaller than 90°, the evaluation unit 164 corrects, for a successful skill, "handspring forward and salto forward tuck with 1/1 twist" to "handspring forward and salto forward pike with 1/1 twist", and corrects "3.2" for the D score to "3.6".

Note that, when the angle of a twist is within a range of 270° to 450° and a waist bend angle is 45° or larger and a knee bend angle is 90° or larger, the evaluation unit 164 keeps the D score "3.2".

Hereinbefore, the description was given as an example of a case in which the D score is evaluated using "the angle of a twist" and a "tuck posture". Besides, using another posture, the D score is corrected. For example, when a waist is not bent at a waist angle of 45° or larger in a posture of the player at the time of the player's touch on the vault 22b, that is, on the boundary between the first phase 22-1 and the second phase 22-2, the evaluation unit 164 does not approve the skill and does not give the D score.

As described above, after the confirmation of a skill, the evaluation unit 164 checks how much a posture of the player 10 deviates from an ideal posture of the confirmed skill, and thereby calculates the E score. The evaluation unit 164 makes the E score lower as the deviation is larger.

The evaluation unit 164 determines points deducted in accordance with the amount of deviation in an evaluation item for each of the confirmed postures between the takeoff in the first phase 22-1 and the landing in the second phase 22-2, and evaluates the E score. Note that, for example, regarding waist, knee, and ankle angles as evaluation items, a waist, a knee, and an ankle always bend at the time of takeoff or landing. Therefore, the evaluation unit 164 does not subject deviation in a predetermined joint position at a predetermined timing (at the timing of takeoff or landing) to point deduction. The amount of deviation may be calculated by any of a maximum (minimum) value, an average value, a standard deviation range, and a total amount in a section. Furthermore, a section in which the amount of deviation is calculated may be limited.

The evaluation unit 164 judges the first phase 22-1 and the second phase 22-2 in terms of a break of a skill related to a motion posture, by using the coordinates of a waist and the coordinates of hands. The evaluation unit 164 judges the kind of a motion posture, such as a front handspring, a side handspring, or a spring after the rondat of the front or side handspring, based on a vector shift in the direction of the front of a body of the player 10 in the first phase 22-1.

The evaluation unit 164 judges the kind of a motion posture, that is, whether a spring is simply a front handspring or a single or double salto, based on a shift of the upper part of the body of the player 10 in the second phase 22-2. The evaluation unit 164 judges a shift in a twist angle of the body during a salto, based on a shift in the right-left direction of the waist. Similarly, the evaluation unit 164 judges a posture by using a parameter for another evaluation item, and confirms a motion posture. For example, evaluation items corresponding to the skill described with FIG. 22 are a "twist angle", a "tuck posture", and a "landing posture". The evaluation unit 164 judges the success or failure of the skill, based on a D evaluation index corresponding to each of the evaluation items, confirms a posture (a static posture, a motion posture), and gives the D score. Note that a description of the landing posture will be omitted.

Subsequently, the evaluation unit 164 calls the evaluation items corresponding to the determined postures. For example, the evaluation unit 164 reads out an E evaluation index corresponding to each of the evaluation items, and determines a reference value for point deduction. The reference value is 0 (with no point deducted), 0.1 (small error), 0.3 (middle error), or 0.5 (large error). The evaluation unit 164 determines the total of points deducted determined by the evaluation items, and subtracts from 10 points the total of the points deducted, so as to confirm the E score.

Figure 23:
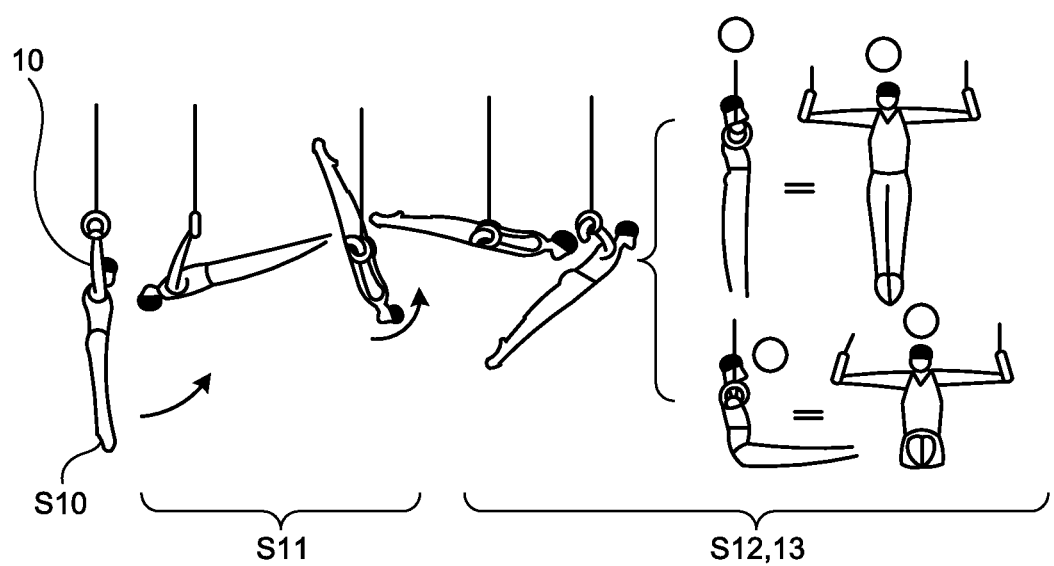
FIG. 23 is a diagram illustrating an example of a performance of the still rings.

FIG. 23 is a diagram illustrating an example of a performance of the still rings. A skill of the still rings is composed of a combination of three types of motions, that is, a swing motion in which a vertical rotating motion is quickly performed, a strength motion of standing still with a specific posture by strength being kept, and a motion of slowly shifting a specific static posture to a subsequent static posture.

For example, there are 13 types of static postures each approved as a skill of the break of a motion. A plurality of types of static postures serving as basic postures and a position of the bottom dead center of a swing motion are used to judge a skill. Among consecutive motions, a motion included between breaks of motions is regarded as an element. The evaluation unit 164 judges a skill (a motion posture) by using a single element or a combination of a plurality of elements. The evaluation unit 164 gives a D score in accordance with the difficulty of a motion element.

Basically, a condition for the approval of a skill is that a predetermined element is included in a motion. A skill illustrated in FIG. 23 is "Felge backward stretched to the cross", a common name "Azarian". This skill is performed in such a manner that a player starts from a posture of hanging down from rings, and then, with a posture of a stretched body and stretched arms being kept, performs Felge. Subsequently, the player horizontally stretches arms, and takes a posture of a cross (the cross) or a posture of the L-cross to maintain the posture for a predetermined time (for example, 2 seconds).

The skill "Felge backward stretched to the cross" is a skill of a difficulty D. When determining that this skill has been successful, the evaluation unit 164 gives a D score "0.4".

When all of the evaluation items 1 to 4 are successful, the evaluation unit 164 judges that the skill "Felge backward stretched to the cross" has been successful (the skill is confirmed).

Evaluation item 1A: a skill starts with an almost static hang posture (step S10).

Evaluation item 2A: a posture of a stretched body and stretched arms is kept during Felge (Step S11).

Evaluation item 3A: in a second static posture, a requirement for success of the cross (or the L-cross) is satisfied (Step S12).

Evaluation item 4A: a standstill for a predetermined time is recognized (Step S13).

For the evaluation item 1A, the evaluation unit 164 acquires an evaluation index corresponding to the evaluation item 1A, and judges whether the evaluation item 1A is satisfied. For example, when a static condition for a hang posture is satisfied, the evaluation unit 164 judges that the evaluation item 1A is satisfied.

For the evaluation item 2A, the evaluation unit 164 acquires an evaluation index corresponding to the evaluation item 2A, and judges whether the evaluation item 2A is satisfied. For example, when a requirement for a posture of stretched body, a requirement for an elbow bend angle, and a requirement for stretched arms are satisfied during the performance of Felge, the evaluation unit 164 judges that the evaluation item 2A is satisfied.

For the evaluation item 3A, the evaluation unit 164 acquires an evaluation index corresponding to the evaluation item 3A, and judges whether the evaluation item 3A is satisfied. For example, when an arm angle (the angle of arms with respect to a horizontal axis at a shoulder position) satisfies a requirement for a static posture of the cross, the evaluation unit 164 judges that the evaluation item 3A is satisfied.

For the evaluation item 4A, the evaluation unit 164 acquires an evaluation index corresponding to the evaluation item 4A, and judges whether the evaluation item 4A is satisfied. For example, when a requirement for a static condition in a posture of the cross (or the L-cross) is satisfied, the evaluation unit 164 judges that the evaluation item 4A is satisfied.

As described above, the evaluation unit 164 confirms a skill, and then calculates the E score by checking how much the confirmed skill deviates from an ideal posture of the confirmed skill. As the deviation is larger, the evaluation unit 164 makes the E score smaller.

The evaluation unit 164 acquires evaluation items of a posture included in a motion posture illustrated in FIG. 23. Examples of evaluation items of postures included in "Felge backward stretched to the cross" include a waist bend angle, a knee bend angle, an arm (elbow) bend angle, leg (heel) opening, an arm angle in the cross or the like, and an insufficient standstill in a strength hold element. The evaluation unit 164 acquires an evaluation index corresponding to each of the evaluation items, compares the evaluation index with a value based on joint position data, and thereby identifies a reference value for point deduction. The evaluation unit 164 calculates the total of points deducted determined by the evaluation items and subtracts from 10 points the total of the points deducted, so as to confirm the E score.

By executing the above-described processing, the evaluation unit 164 outputs information on the kind of a skill performed by the player 10 and the D and E scores related to the skill to the output unit 165. Furthermore, the evaluation unit 164 outputs to the output unit 165, an evaluation item for a static posture, evaluation items for postures included in a motion posture, and joint position data of the player 10, each of which has been used in the calculation of the D score and the E score.

The description will be returned to FIG. 5. The output unit 165 acquires information on an evaluation result from the evaluation unit 164, and creates data on a display screen in accordance with the evaluation result. The output unit 165 outputs the created data on the display screen to the display unit 140 to display the data.

When the output unit 165 receives, via the input unit 130, a specification of a specific time point (frame number) in a performance performed by the player 10 performed, the output unit 165 creates a display screen to display values of the evaluation items obtained from the joint position data of the player 10, the position data corresponding to the specific time point. Examples of the values of the evaluation items correspond to an arm angle of the cross, a waist bend angle, a knee bend angle, a shoulder position, a waist position, an elbow position, a knee position, a tiptoe position, and leg opening. When displaying the values of the evaluation items at a specific time point, the output unit 165 also displays 3D model data corresponding to the specific time point on the display screen.

Furthermore, based on sensor data corresponding to a specific section among sensor data on a performance section that are stored in the sensing DB 151, the output unit 165 creates a display screen to display a shift in distance between joints, a shift in distance between a certain joint or a specific part and a reference plane, and a shift in an angle formed by the certain joint or the specific part and the reference plane. For example, the specific section corresponds to a section specified by a user via the input unit 130. Although not illustrated, information on the three-dimensional coordinates of the reference plane, for example, is stored in the storage unit 150. The reference plane is a plane serving as a reference when an evaluation item is a height from a specific plane to a specific joint position or when an evaluation item is an angle formed by the specific plane and the specific joint position. For example, when an evaluation item is a height from a floor to the top of a head, the floor serves as a reference plane.

Figure 24:
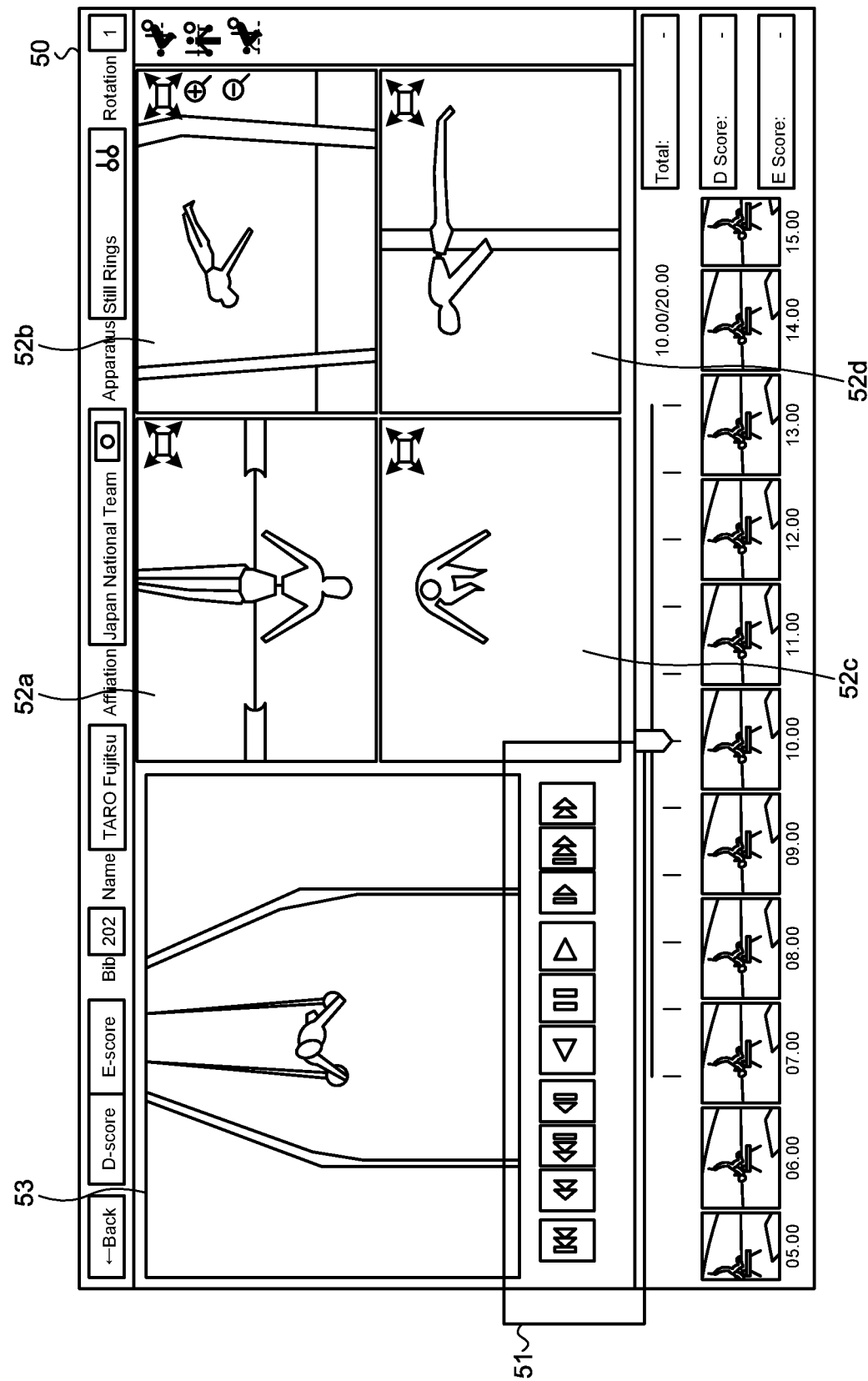
FIG. 24 is a diagram (1) illustrating an example of a display screen.

Hereinafter, a description is given of an example of a display screen created by the output unit 165. FIG. 24 is a diagram (1) illustrating an example of the display screen. As illustrated in FIG. 24, the display screen 50 includes a control button 51 and display areas 52a, 52b, 52c, 52d, and 53. The control button 51 is a button to control the time of picture data and 3D model data to which a user (for example, a referee) refers. Examples of the control button 51 include buttons for reproduction, reverse reproduction, slow reproduction, reverse slow reproduction, skip, and reverse skip. The user operates the input unit 130 to select a control button 51, and, when receiving the selection, the output unit 165 adjusts the time of the picture data and 3D model data to be displayed on the display screen 50, in accordance with the selected button.

For example, the display area 52a is an area to display a picture obtained by photographing a 3D model from a virtual viewpoint set just above the player 10. The display area 52b is an area to display a picture obtained by photographing the 3D model from an any desired virtual viewpoint specified by the user. In accordance with an operation of the virtual viewpoint by the user, the user can check a competitor's posture from an any desired direction. The display area 52c is an area to display a picture obtained by photographing the 3D model from a virtual viewpoint set at the front of the player 10. The display area 52d is an area to display a picture obtained by photographing the 3D model from a virtual viewpoint set just beside the player. The output unit 165 acquires 3D model data from the 3D model DB 154.

The display area 53 is an area to display data on a picture photographed with a camera. The output unit 165 acquires the picture data from a picture DB (not illustrated). The picture DB is a database to store data on a picture photographed with the camera.

Figure 25:
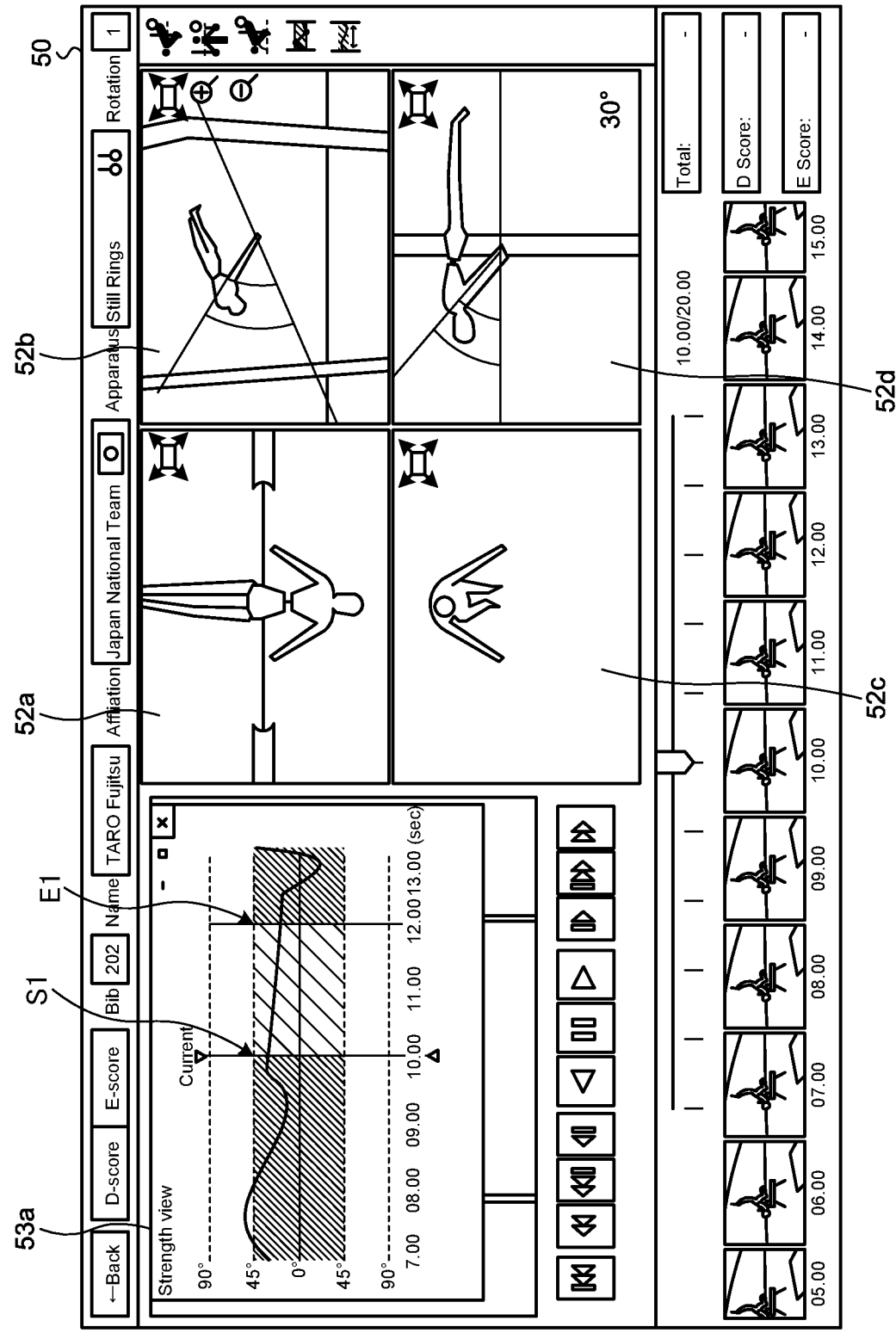
FIG. 25 is a diagram (2) illustrating an example of a display screen.

When the user wants to judge a motion posture, the user operates the control button 51 to instruct a starting point and an end point of a section of the desired motion posture. FIG. 25 is a diagram (2) illustrating an example of a display screen. In the example illustrated in FIG. 25, a selected screen 53a is displayed on the display screen 50, in which the starting point S1 and the end point E1 are specified. A graph included in the selected screen 53a indicates, for example, time-series changes in a certain evaluation item. The horizontal axis of the graph corresponds to time (frame number), and the vertical axis of the graph corresponds to a value of the evaluation item. The output unit 165 displays a 3D model picture corresponding to a time from the starting point S1 to the end point E1, on the display areas 52a, 52b, 52c, and 52d.

Figure 26:
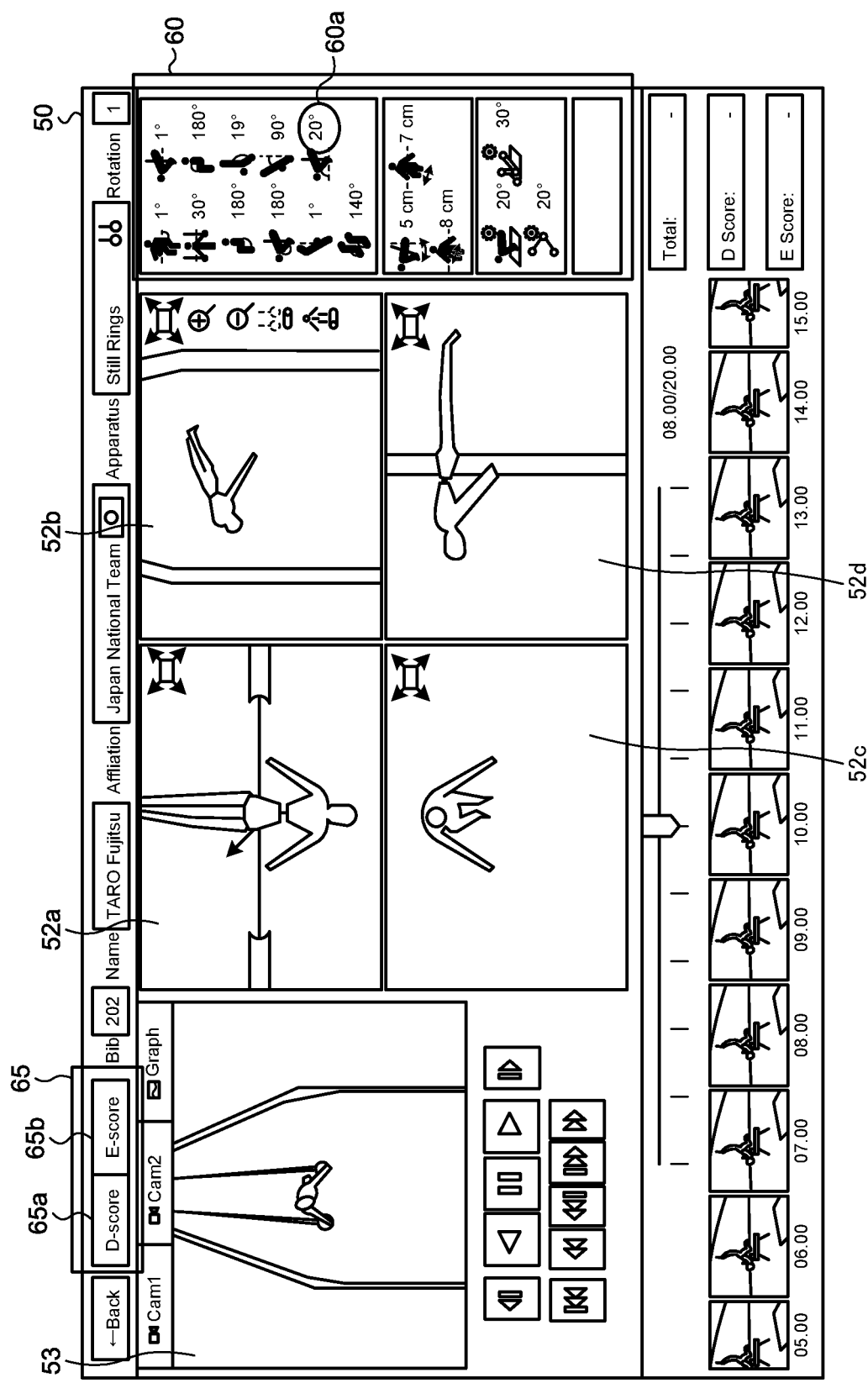
FIG. 26 is a diagram (3) illustrating an example of a display screen.

FIG. 26 is a diagram (3) illustrating an example of a display screen. In the example illustrated in FIG. 26, in addition to the display area described in FIG. 24, a selection screen 60 and a switching button 65 are included. The selection screen 60 is a screen to select a plurality of evaluation items. The switching button 65 is a button to switch between selection of an evaluation item for marking the D score and selection of an evaluation item for marking the E score. The switching button 65 includes a D score button 65a and an E score button 65b.

For example, when the D score button 65a of the switching button 65 is selected, the output unit 165 displays, on the selection screen 60, evaluation items serving as points to be checked for marking the D score. When the E score button 65b of the switching button 65 is selected, the output unit 165 displays, on the selection screen 60, evaluation items serving as points to be checked for marking the E score. Furthermore, when the D score button 65a is selected, the output unit 165 displays a list of icons for the points to be checked for marking the D score. Furthermore, just beside icons of the evaluation items, evaluation data (for example, an angle) of the evaluation items may be outputted on a real-time basis. Furthermore, when a selection item 60a in the selection screen 60 is selected, data on the display screen illustrated in FIG. 27 are displayed on the display unit 140.

Figure 27:
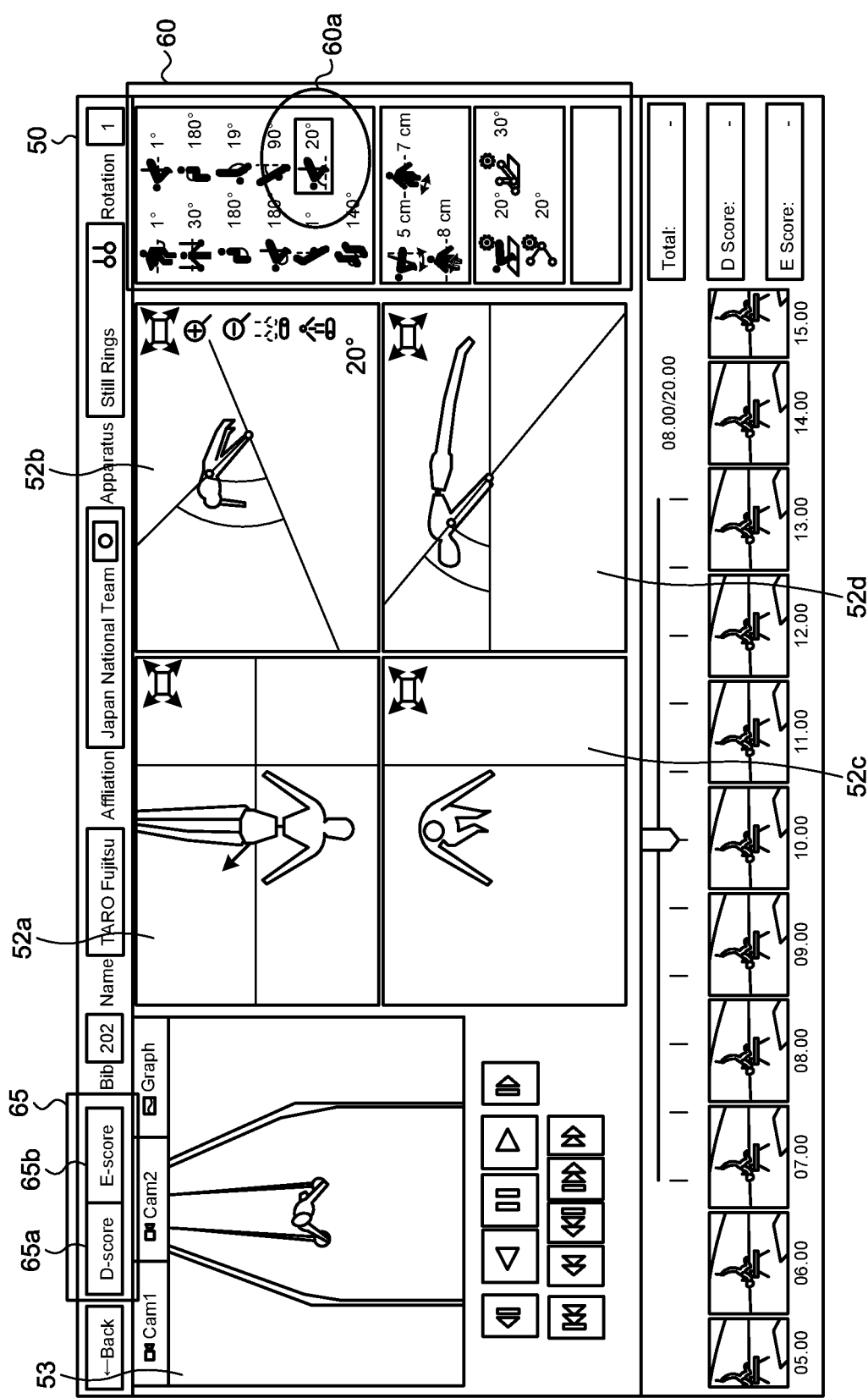
FIG. 27 is a diagram (4) illustrating an example of a display screen.

FIG. 27 is a diagram (4) illustrating an example of a display screen. For example, the output unit 165 superimposes, on an image of a 3D model, an image obtained by photographing the 3D model from a virtual viewpoint corresponding to the evaluation item 60b and a value corresponding to the evaluation item (for example, a three-dimensional angle), and displays the resulting image on the display screens 52b and 52d. For example, the output unit 165 creates an image obtained by photographing the 3D model based on a table in which an evaluation item is associated with the position of a virtual viewpoint corresponding to the evaluation item. Furthermore, setting of an easy-to-see angle in accordance with a point to be checked allows an automatic selection of a picture from a viewpoint among the pictures 52a to 53d on which an evaluation angle is to be displayed.

Figure 28:
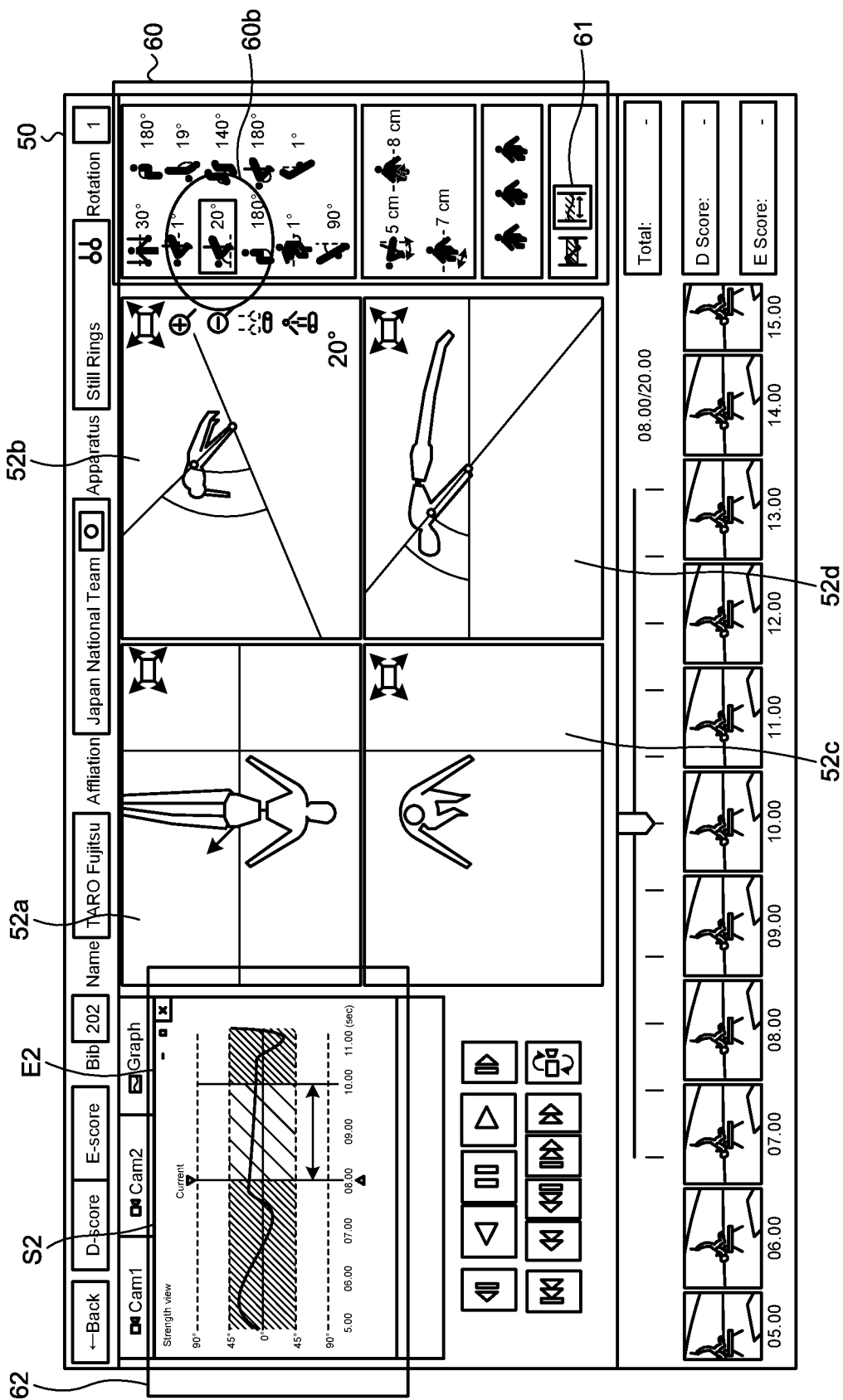
FIG. 28 is a diagram (5) illustrating an example of a display screen.

FIG. 28 is a diagram (5) illustrating an example of a display screen. When receiving a selection of the graph button 61 included in the display screen 50, the output unit 165 creates a graph indicating a shift in an evaluation item value corresponding to the evaluation item 60b presently selected, and displays the graph on the display screen (selection screen) 62. When a user specifies a starting point S2 and an end point E2 on the display screen 62, the output unit 165 creates a picture of a 3D model corresponding to the specified section, and displays the picture on the display areas 52a to 52d. For example, in the case of a strength hold element for 2 seconds, a picture of a 3D model corresponding to an evaluation item is desirably displayed for 2 seconds. Accordingly, when the evaluation item corresponding to the strength hold element is selected, the output unit 165 may automatically specify the starting point S2 and the end point E2 on the display screen 62. In this case, the output unit 165 sets a time between the starting point S2 and the end point E2 to 2 seconds. Alternatively, when a section in which the user recognizes a standstill is specified as a section from the starting point S2 to the end point E2, the time of the section may be automatically measured and displayed for the user. In this case, when this time is 2 seconds or longer, it may be automatically judged that a strength hold element has been successful.

Figure 29:
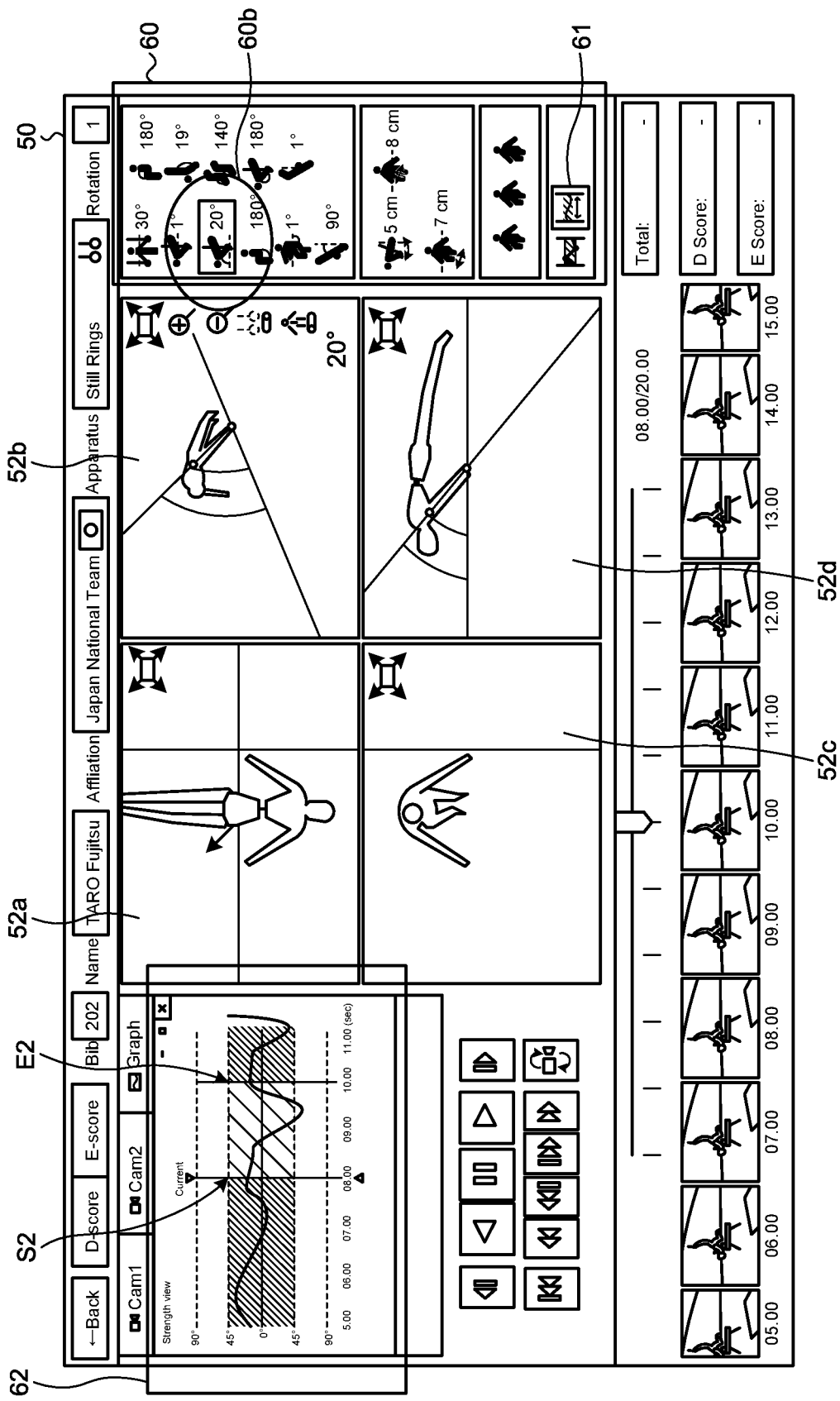
FIG. 29 is a diagram (6) illustrating an example of a display screen.

When an evaluation item corresponding to a strength hold element is selected, the output unit 165 may set a threshold corresponding to the evaluation item. Then, when a value exceeds the set threshold, the output unit 165 may highlight a portion of a graph in which the set threshold is exceeded. FIG. 29 is a diagram (6) illustrating an example of a display screen. In the example illustrated in FIG. 29, a value corresponding to an evaluation item has changed to exceed a threshold, and accordingly, the output unit 165 highlights a portion, corresponding to the change in value, of a graph on the display screen 62. Specifically, depending on whether a change in a value of an evaluation item for a certain motion posture is within a predetermined range, the output unit 165 may change a style for display of a portion between the starting point S2 and the end point E2 on the display screen 62. For example, when a value of a portion between the starting point S2 and the end point E2 has deviated from a predetermined range (a knee angle is in a range of ±45°), the output unit 165 shades the portion between the starting point S2 and the end point E2 in a first color (for example, red). In contrast, when a value of the portion between the starting point S2 and the end point E2 has not deviated from the predetermined range (a knee angle is in the range of ±45°), the output unit 165 shades the portion between the starting point S2 and the end point E2 in a second color (for example, blue). In the example illustrated in FIG. 29, there is a portion with a value deviated from a predetermined range (a knee angle is in the range of ±45°) between the starting point S2 and the end point E2, and accordingly, the portion between the starting point S2 and the end point E2 is shaded in red.

Furthermore, in the case where an evaluation item corresponding to a strength hold element is selected, when the graph button 61 is pressed, the output unit 165 may display changes in angle and distance related to a set evaluation item in an area of the display screen 62. When a section in which the strength hold element is performed is automatically or manually specified, the output unit 165 may detect the maximum and the minimum in the specified section, and display the maximum and the minimum.

Figure 30:
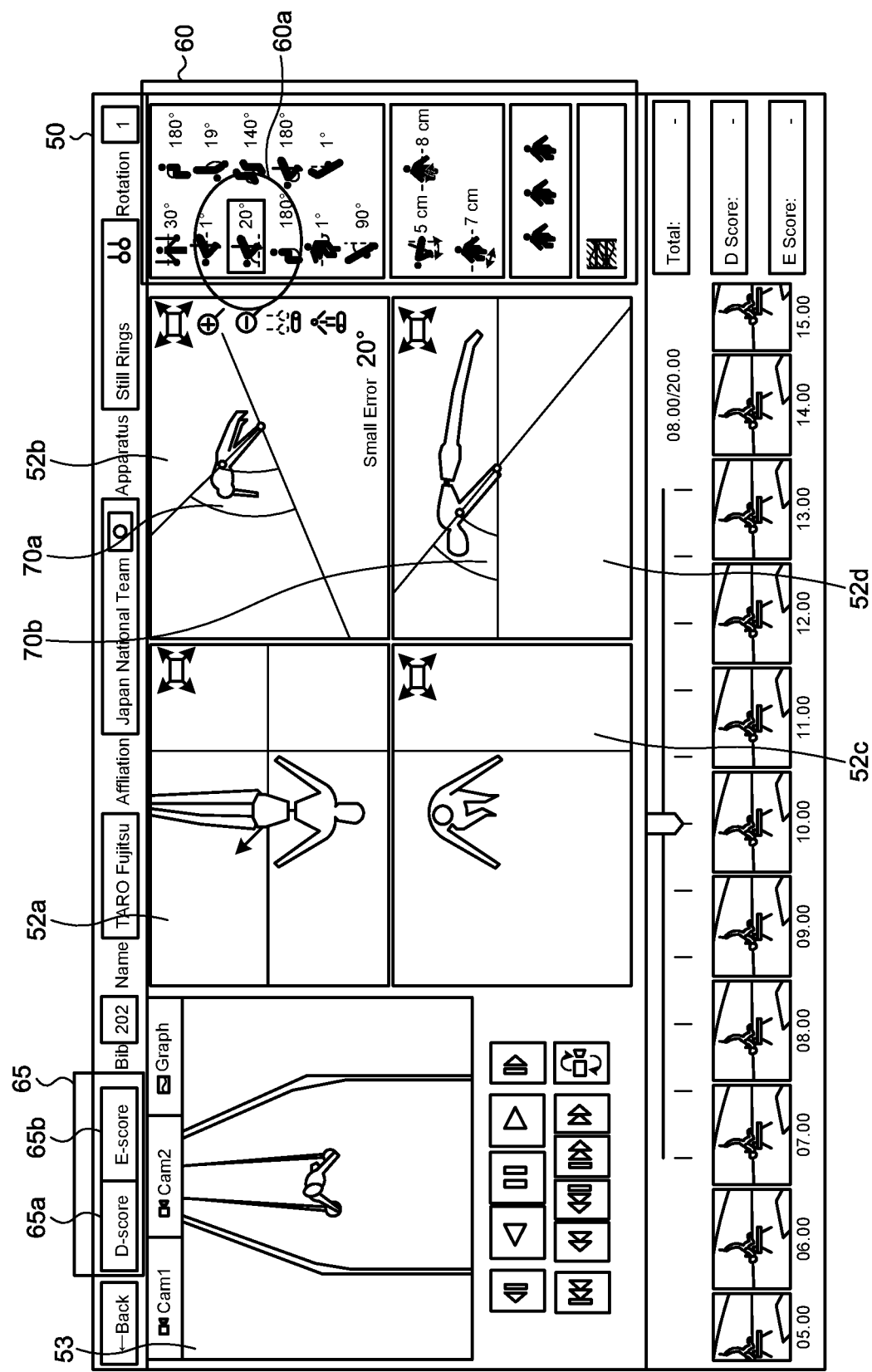
FIG. 30 is a diagram (7) illustrating an example of a display screen.

FIG. 30 is a diagram (7) illustrating an example of a display screen. The display screen 50 illustrated in FIG. 30 is a display screen displayed by the output unit 165 when the E score button 65b is selected. For example, the output unit 165 changes a color to be displayed in accordance with how much a value of an evaluation item deviates from an ideal value for the evaluation item (the degree of deviation). For example, when the degree of deviation of a value of an evaluation item from an ideal value for the evaluation item is a small error deviation, the output unit 165 displays, in a first color, areas 70a and 70b of a 3D model corresponding to the evaluation item, and "Small Error" is displayed in the first color.

When the degree of deviation of a value of an evaluation item from the ideal value for the evaluation item is a middle error deviation, the output unit 165 displays, in a second color, the areas 70a and 70b of the 3D model corresponding to the evaluation item, and "Middle Error" is displayed in the second color. When the degree of deviation of a value of an evaluation item from the ideal value for the evaluation item is a large error deviation, the output unit 165 displays, in a third color, the areas 70a and 70b of the 3D model corresponding to the evaluation item, and "Large Error" is displayed in the third color.

Figure 31:
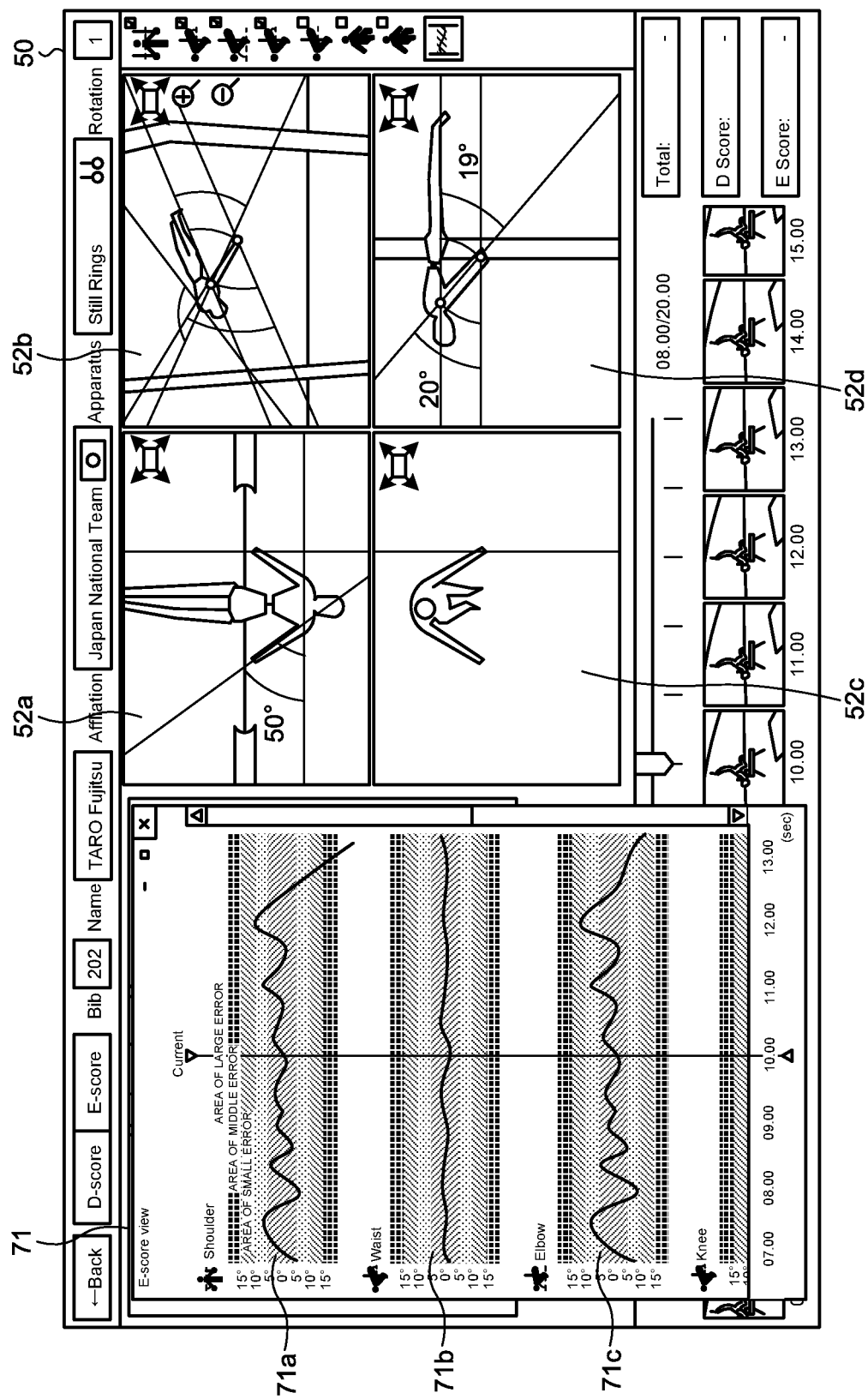
FIG. 31 is a diagram (8) illustrating an example of a display screen.

Note that, when the E score button 65b is selected and information related to the E score is displayed on the display screen 50, the output unit 165 may simultaneously display a plurality of evaluation items (points to be checked: joint angles, a distance between joints) by using a 3D model or a graph. FIG. 31 is a diagram (8) illustrating an example of a display screen. In the example illustrated in FIG. 31, graphs 71a, 71b, and 71c that indicate a shift in values of evaluation items related to the E score are displayed in the display area 71. When displaying the graphs 71a to 71c, the output unit 165 may distinguishably display areas of the small error, the middle error, and the large error. Thus, a shift in value of an evaluation item can be easily understood, so that a referee can be supported in making a judgment.

Although a description is omitted in the descriptions about the display screen in FIG. 24 to FIG. 31, the output unit 165 may display a scoring result outputted from the evaluation unit 164, in accordance with the display screen.

Figure 32:
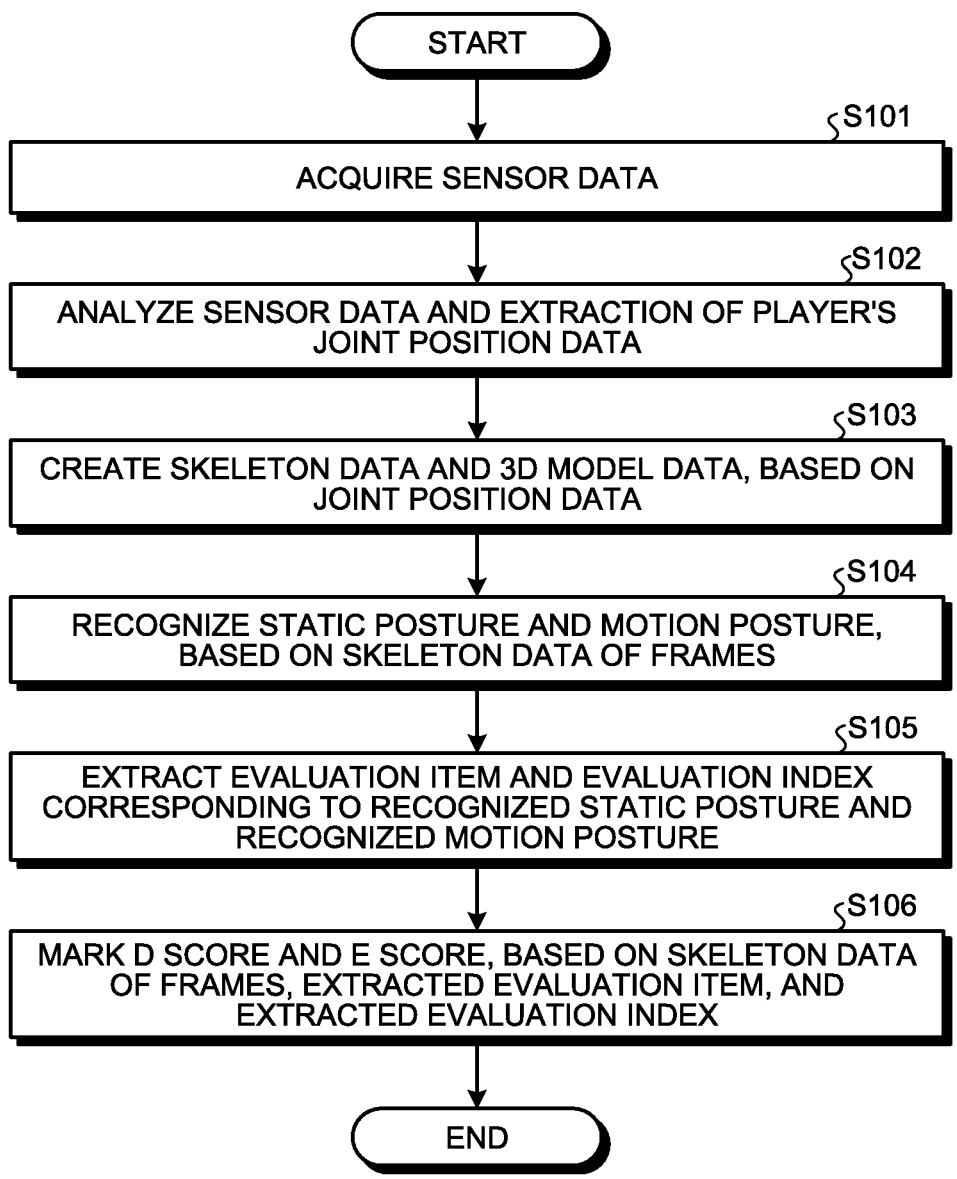
FIG. 32 is a flow chart (1) illustrating a procedure of processing performed by the scoring apparatus according to the present embodiment.

Next, a description is given of a procedure of processing performed by the scoring apparatus 100 according to the present embodiment. FIG. 32 is a flow chart (1) illustrating the procedure of processing performed by the scoring apparatus according to the present embodiment. As illustrated in FIG. 32, the registration unit 161 of the scoring apparatus 100 acquires sensor data, and registers the sensor data in the sensing DB 151 (Step S101).

The extraction unit 162 of the scoring apparatus 100 analyzes the sensor data stored in the sensing DB 151, and extracts joint position data of the player 10 (Step S102). The 3D model creation unit 163 of the scoring apparatus 100 creates skeleton data and 3D model data, based on the joint position data, and stores the skeleton data and the 3D model data in the 3D model DB 154 (Step S103).

The evaluation unit 164 of the scoring apparatus 100 recognizes a static posture and a motion posture, based on the skeleton data of frames (Step S104). The evaluation unit 164 extracts evaluation items and evaluation indexes that correspond to the recognized static posture and the recognized motion posture (Step S105).

The evaluation unit 164 marks the D score and the E score, based on the skeleton data of the frames and the extracted evaluation items and the extracted evaluation indexes (Step S106).

Figure 33:
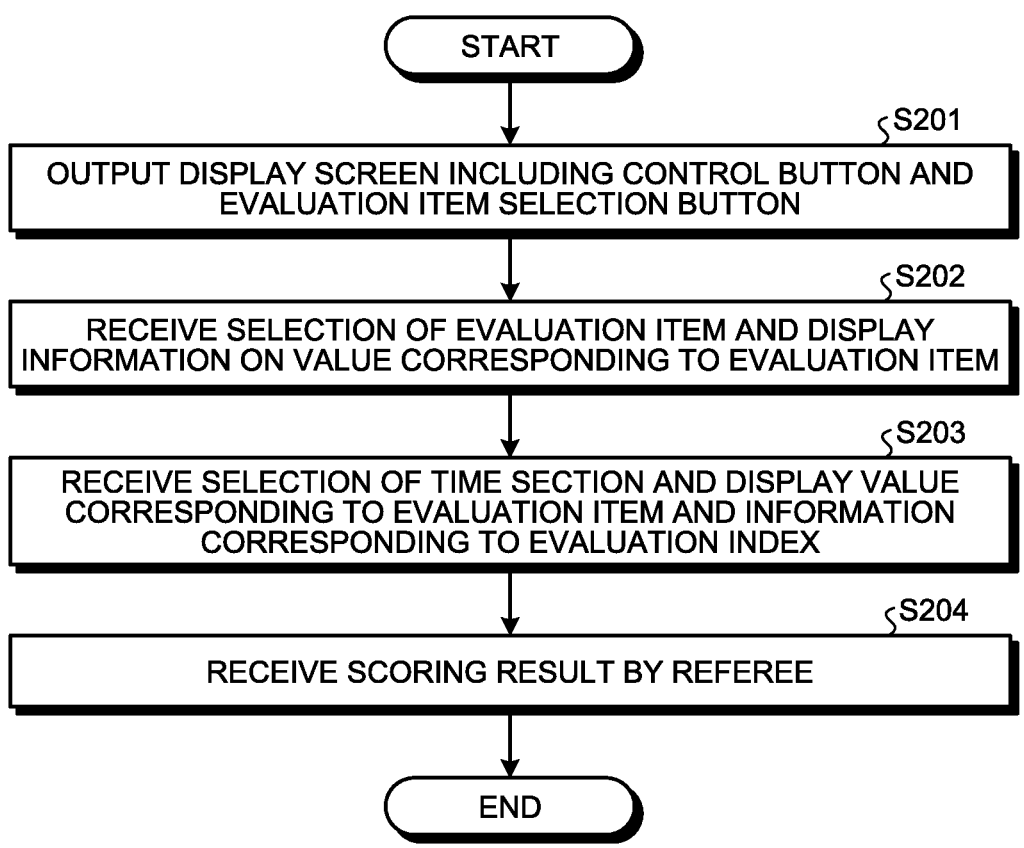
FIG. 33 is a flow chart (2) illustrating a procedure of processing performed by the scoring apparatus according to the present embodiment.

FIG. 33 is a flow chart (2) illustrating a procedure of processing performed by the scoring apparatus according to the present embodiment. As illustrated in FIG. 33, the output unit 165 of the scoring apparatus 100 outputs a display screen including a control button and an evaluation item selection button to the display unit 140 (Step S201). The display screen outputted by the output unit 165 corresponds to the display screen 50 illustrated in FIG. 24 and the other figures.

The output unit 165 receives a selection of an evaluation item, and displays information on a value corresponding to the evaluation item (Step S202). For example, the output unit 165 displays the display screen 50 illustrated in FIG. 26 and FIG. 27 at Step S202.

The output unit 165 receives a selection of a time section, and displays the value corresponding to the evaluation item and information corresponding to an evaluation index (Step S203). For example, the output unit 165 displays the display screen 50 illustrated in FIG. 28 to FIG. 31 at Step S203. The output unit 165 receives a result of scoring by a referee (Step S204).

Next, a description is given of effects of the scoring apparatus 100 according to the present embodiment. The scoring apparatus 100 extracts joint information of the player 10, based on sensor data on the player 10 who gives a performance, and estimates a posture (a static posture and a motion posture) under a performance given by the player 10. The scoring apparatus 100 acquires an evaluation item that indicates a point to be checked for the evaluation of the estimated posture, and an evaluation index that indicates an index of evaluation of the evaluation item. Then, the scoring apparatus 100 evaluates a skill under a performance of the player 10, based on a player's joint information, the evaluation item, and the evaluation index. Thus, both the success or failure of a skill and the degree of perfection of the skill in a scoring competition can be judged.

Furthermore, the scoring apparatus 100 marks the D score of a skill by comparing a competitor's posture acquired from the joint information corresponding to the evaluation item with a condition for success of a skill. Thus, the scoring apparatus 100 can automatically evaluate the success or failure of a skill.

The scoring apparatus 100 evaluates the degree of perfection, based on how much a series of competitor's joint motions obtained from joint information corresponding to an evaluation item deviates from a series of ideal joint motions stored in the rule DB 156. Thus, the scoring apparatus 100 can automatically evaluate the degree of perfection of a skill.

The scoring apparatus 100 performs processing to create a display screen in which an evaluation result is associated with a shift in value relevant to an evaluation item and information on an evaluation index, and to display the evaluation result on the display unit 140. Thus, a referee for scoring competitions can be supported, and accordingly, fairness in refereeing of scoring competitions can be enhanced. Thus, a referee can perform scoring work more efficiently, and accordingly, a player can expect that the waiting time for a scoring result is shorter. Thus, the player can concentrate on a performance. Furthermore, time to manage the entirety of a tournament can be made shorter.

Figure 34:
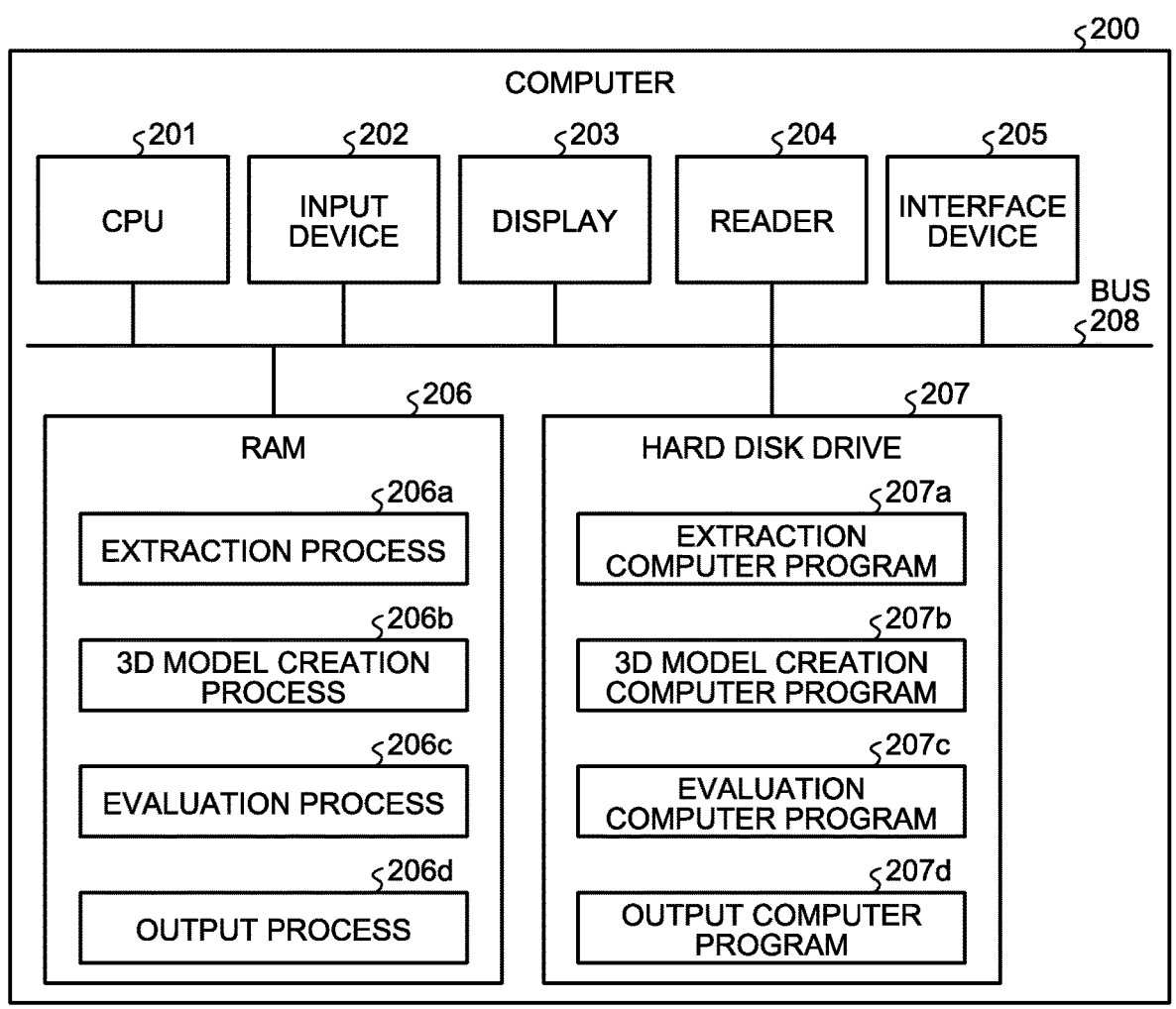
FIG. 34 is a diagram illustrating an example of a hardware configuration of a computer that effects the same functions as the functions of the scoring apparatus.

Here, a description is given of an example of a hardware configuration of a computer that effects the same functions as the functions of the scoring apparatus 100 described in the present embodiment. FIG. 34 is a diagram illustrating an example of a hardware configuration of a computer that effects the same functions as the functions of the scoring apparatus.

As illustrated in FIG. 34, a computer 200 includes a CPU 201 that executes various data processing, an input device 202 that receives the input of data from a user, and a display 203. The computer 200 further includes a reader 204 that reads, for example, a computer program from a storage medium, and an interface device 205 that sends and receives data to and from another computer through a wireless network. The computer 200 further includes a RAM 206 that temporarily stores various kinds of information, and a hard disk drive 207. Each of the devices 201 to 207 is connected to a bus 208.

The hard disk drive 207 includes an extraction computer program 207a, a 3D model creation computer program 207b, an evaluation computer program 207c, and an output computer program 207d. The CPU 201 reads the extraction computer program 207a, the 3D model creation computer program 207b, the evaluation computer program 207c, and the output computer program 207d, and loads the above-mentioned computer programs to the RAM 206.

The extraction computer program 207a functions as an extraction process 206a. The 3D model creation computer program 207b functions as a 3D model creation process 206b. The evaluation computer program 207c functions as an evaluation process 206c. The output computer program 207d functions as an output process 206d.

Processing by the extraction process 206a corresponds to processing by the extraction unit 162. Processing by the 3D model creation process 206b corresponds to processing by the 3D model creation unit 163. Processing by the evaluation process 206c corresponds to processing by the evaluation unit 164. Processing by the output process 206d corresponds to processing by the output unit 165.

Note that the computer programs 207a to 207d are not necessarily stored in the hard disk drive 207 from the beginning. For example, the computer programs are stored in "a portable physical medium" to be inserted into the computer 200, such as a flexible disk (FD), a CD-ROM, a DVD disk, a magneto-optical disk, or an IC card. Then, the computer 200 may read and execute the computer programs 207a to 207d.

Both the success or failure of a skill and the degree of perfection of the skill in a scoring competition can be judged.

All examples and conditional language provided herein are intended for the pedagogical purposes of aiding the reader in understanding the invention and the concepts contributed by the inventors to further the art, and are not to be construed as limitations to such specifically recited examples and conditions, nor does the organization of such examples in the specification relate to a showing of the superiority and inferiority of the invention. Although one or more embodiments of the present invention have been described in detail, it should be understood that the various changes, substitutions, and alterations could be made hereto without departing from the spirit and scope of the invention.

What is claimed is:

1. A scoring method executed by a processor, the scoring method comprising:
    acquiring sensor data obtained by measuring a competitor in a scoring competition;
    extracting joint information of the competitor, based on an analysis result of the sensor data;
    determining an evaluation item relevant to an evaluation of a posture of the competitor from a plurality of evaluation items, based on a rule and the posture of the competitor determined from the joint information of the competitor, the rule defining a relation between the posture specified by a series of joint motions and joint angles, the evaluation item corresponding to the posture among the plurality of evaluation items, and an evaluation index corresponding to the evaluation item that is used for evaluating performance in the scoring competition; and
    generating and outputting a display screen including an evaluation result and a value of the evaluation item used for the evaluation, the evaluation result being obtained by evaluating a success or failure of a skill and a degree of perfection of the skill in a performance of the competitor determined from the posture of the competitor, based on the evaluation index associated with the evaluation item relevant to the evaluation of the posture of the competitor, and the joint information of the competitor, wherein,
    the posture defined by the rule includes a static posture specified by the series of joint motions and joint angles, and a motion posture composed of a combination of a plurality of static postures,
    the determining includes: determining from a time-series change in the joint information of the competitor, each of the static postures of the competitor in the performance; determining the motion posture corresponding to the combination of the determined static postures; and determining the evaluation item corresponding to the determined motion posture, and
    the outputting includes comparing a success condition of the static postures included in the evaluation index of the evaluation item of the motion posture with the static postures determined from the time-series change in the joint information of the competitor, and, on condition that success conditions of the static postures are satisfied, outputting that the motion posture is successful.

2. The scoring method according to claim 1, wherein
    the evaluation index includes a posture condition for success of a skill in a performance such that the posture condition is associated with the evaluation item, and
    the evaluating is to evaluate a success or failure of the skill by comparing the condition with a posture of the competitor, the posture being obtained from joint information corresponding to the evaluation item.

3. The scoring method according to claim 1, wherein
    the evaluation index includes information on a series of ideal motions of joints in a predetermined performance such that the information is associated with the evaluation item, and
    the evaluating is to evaluate the degree of perfection of the skill, based on how much a series of joint motions of the competitor that is obtained from joint information corresponding to the evaluation item deviates from the series of the ideal joint motions.

4. The scoring method according to claim 1, wherein
    the outputting includes:
    receiving a specification of a specific time point in the performance, and
    generating and displaying the display screen including a value of the evaluation item obtained from joint information of an actual competitor, the joint information corresponding to the specific time point, and a 3D model based on the joint information of the competitor obtained from sensor data corresponding to a specified first time point.

5. The scoring method according to claim 1, wherein:
    the outputting includes:
    based on sensor data corresponding to a specific section among sensor data in a section of the performance, generating and displaying the display screen including a shift in a distance between joints, a shift in a distance between a certain joint or a specific part and a reference plane, and a shift in an angle formed by the certain joint or the specific part and the reference plane.

6. A non-transitory computer-readable recording medium storing therein a scoring program that causes a computer to execute a process, the process comprising:

acquiring sensor data obtained by measuring a competitor in a scoring competition;
extracting joint information of the competitor, based on an analysis result of the sensor data;
determining an evaluation item relevant to an evaluation of a posture of the competitor from a plurality of evaluation items, based on a rule and the posture of the competitor determined from the joint information of the competitor, the rule defining a relation between the posture specified by a series of joint motions and joint angles, the evaluation item corresponding to the posture among the plurality of evaluation items, and an evaluation index corresponding to the evaluation item that is used for evaluating performance in the scoring competition; and
generating and outputting a display screen including an evaluation result and a value of the evaluation item used for the evaluation, the evaluation result being obtained by evaluating a success or failure of a skill and a degree of perfection of the skill in a performance of the competitor determined from the posture of the competitor, based on the evaluation index associated with the evaluation item relevant to the evaluation of the posture of the competitor and the joint information of the competitor, wherein,
the posture defined by the rule includes a static posture specified by the series of joint motions and joint angles, and a motion posture composed of a combination of a plurality of static postures,
the determining includes: determining from a time-series change in the joint information of the competitor, each of the static postures of the competitor in the performance; determining the motion posture corresponding to the combination of the determined static postures; and determining the evaluation item corresponding to the determined motion posture, and
the outputting includes comparing a success condition of the static postures included in the evaluation index of the evaluation item of the motion posture with the static postures determined from the time-series change in the joint information of the competitor, and in response to satisfaction of the success condition of the static postures, outputting that the motion posture is successful.

7. The non-transitory computer-readable recording medium according to claim 6, wherein
the evaluation index includes a posture condition for success of a skill in a performance such that the posture condition is associated with the evaluation item, and
the evaluating is to evaluate a success or failure of the skill by comparing the condition with a posture of the competitor, the posture being obtained from joint information corresponding to the evaluation item.

8. The non-transitory computer-readable recording medium according to claim 6, wherein
the evaluation index includes information on a series of ideal joint motions in a predetermined performance such that the information is associated with the evaluation item, and
the evaluating is to evaluate the degree of perfection of the skill, based on how much a series of joint motions of the competitor that is obtained from joint information corresponding to the evaluation item deviates from the series of the ideal joint motions.

9. The non-transitory computer-readable recording medium according to claim 6, wherein the outputting includes:
receiving a specification of a specific time point in the performance, and
generating and displaying the display screen including a value of the evaluation item, the value being obtained from joint information of an actual competitor, the information corresponding to the specific time point, and a 3D model based on the joint information of the competitor obtained from sensor data corresponding to a specified first time point.

10. The non-transitory computer-readable recording medium according to claim 6, wherein the outputting includes:
based on sensor data corresponding to a specific section among sensor data in a section of the performance, generating and displaying the display screen including a shift in a distance between joints, a shift in a distance between a certain joint or a specific part and a reference plane, and a shift in an angle formed by the certain joint or the specific part and the reference plane.

11. A scoring apparatus comprising:
a memory; and
a processor coupled to the memory and configured to:
acquire sensor data obtained by measuring a competitor in a scoring competition, and extract joint information of the competitor, based on an analysis result of the sensor data, and
determine an evaluation item relevant to an evaluation of a posture of the competitor from a plurality of evaluation items, based on a rule and the posture of the competitor determined from the joint information of the competitor, the rule defining a relation between the posture specified by a series of joint motions and joint angles, the evaluation item corresponding to the posture among the plurality of evaluation items, and an evaluation index corresponding to the evaluation item that is used for evaluating performance in the scoring competition, and
generate and output a display screen including an evaluation result and a value of the evaluation item used for the evaluation, the evaluation result being obtained by evaluating a success or failure of a skill and a degree of perfection of the skill in a performance of the competitor determined from the posture of the competitor, based on the evaluation index associated with the evaluation item relevant to the evaluation of the posture of the competitor and the joint information of the competitor, wherein,
the posture defined by the rule includes a static posture specified by the series of joint motions and joint angles, and a motion posture composed of a combination of a plurality of static postures,
the processor is further configured to:
determine from a time-series change in the joint information of the competitor, each of the static postures of the competitor in the performance;
determine the motion posture corresponding to the combination of the determined static postures;
determine the evaluation item corresponding to the determined motion posture;
compare a success condition of the static postures included in the evaluation index of the evaluation item of the motion posture with the static postures determined from the time-series change in the joint information of the competitor; and
in response to satisfaction of the success condition of the static postures, output that the motion posture is successful.

12. The scoring apparatus according to claim 11, wherein
the evaluation index includes a posture condition for success of a skill in a performance such that the posture condition is associated with the evaluation item, and
the processor is further configured to: evaluate a success or failure of the skill by comparing the condition with a posture of the competitor, the posture being obtained from joint information corresponding to the evaluation item.

13. The scoring apparatus according to claim 11, wherein
the evaluation index includes information on a series of ideal joint motions in a predetermined performance such that the information is associated with the evaluation item, and
the processor is further configured to: evaluate the degree of perfection of the skill, based on how much a series of joint motions of the competitor that is obtained from joint information corresponding to the evaluation item deviates from the series of the ideal joint motions.

14. The scoring apparatus according to claim 11, wherein the processor is further configured to:
output the evaluation result,
receive a specification of a specific time point in the performance, and
generate and display the display screen including a value of the evaluation item, the value being obtained from joint information of an actual competitor, the information corresponding to the specific time point, and a 3D model based on the joint information of the competitor, obtained from sensor data corresponding to a specified first time point.

15. The scoring apparatus according to claim 11, wherein the processor is further configured to:
output the evaluation result, and
based on sensor data corresponding to a specific section among sensor data in a section of the performance, generate and display the display screen including a shift in a distance between joints, a shift in a distance between a certain joint or a specific part and a reference plane, and a shift in an angle formed by the certain joint or the specific part and the reference plane.

* * * * *